(12) United States Patent
Östergaard

(10) Patent No.: US 7,520,989 B2
(45) Date of Patent: Apr. 21, 2009

(54) SUBSEA SEPARATION APPARATUS FOR TREATING CRUDE OIL COMPRISING A SEPARATOR MODULE WITH A SEPARATOR TANK

(75) Inventor: Inge Östergaard, Heggedal (NO)

(73) Assignee: Vetco Gray Scandinavia AS, Sandvika (NO)

( * ) Notice: Subject to any disclaimer, the term of this patent is extended or adjusted under 35 U.S.C. 154(b) by 429 days.

(21) Appl. No.: 10/505,967

(22) PCT Filed: Feb. 27, 2003

(86) PCT No.: PCT/NO03/00070

§ 371 (c)(1),
(2), (4) Date: Apr. 22, 2005

(87) PCT Pub. No.: WO03/078793

PCT Pub. Date: Sep. 25, 2003

(65) Prior Publication Data

US 2005/0173322 A1   Aug. 11, 2005

(30) Foreign Application Priority Data

Feb. 28, 2002   (NO) .................................. 20020989

(51) Int. Cl.
*E21B 43/00* (2006.01)
(52) U.S. Cl. .............................. 210/512.1; 210/170.11; 210/416.1; 166/267

(58) Field of Classification Search ............ 210/170.11, 210/256, 258, 260, 294, 416.1, 512.1, 513; 166/267
See application file for complete search history.

(56) References Cited

U.S. PATENT DOCUMENTS

| | | | |
|---|---|---|---|
| 3,543,846 A | 12/1970 | Smith et al. | |
| 4,438,817 A | 3/1984 | Pokladnik et al. | |
| 6,068,053 A * | 5/2000 | Shaw .......................... | 166/267 |

FOREIGN PATENT DOCUMENTS

| | | |
|---|---|---|
| GB | 2133446 | 7/1984 |
| NO | 172555 | 8/1993 |
| NO | 304388 | 12/1998 |
| WO | 99/35370 | 3/1984 |

* cited by examiner

*Primary Examiner*—David A Reifsnyder
(74) *Attorney, Agent, or Firm*—Wenderoth, Lind & Ponack, L.L.P.

(57) ABSTRACT

A subsea separation apparatus for processing crude oil, which includes a separator module with a separator tank. The separator tank defines an opening going there through. The opening is located substantially at the geometrical center of the separator tank, and may be used for other processing equipment for the crude oil. The separator tank may be substantially symmetrically placed on a well head, and the separator module may be substantially concentrically placed on the well head.

21 Claims, 27 Drawing Sheets

3a
Separator tank
with a cutout to show
interior of tank

Separator tank with a cutout to show interior of tank

Separator tank with a cutout to show interior of tank

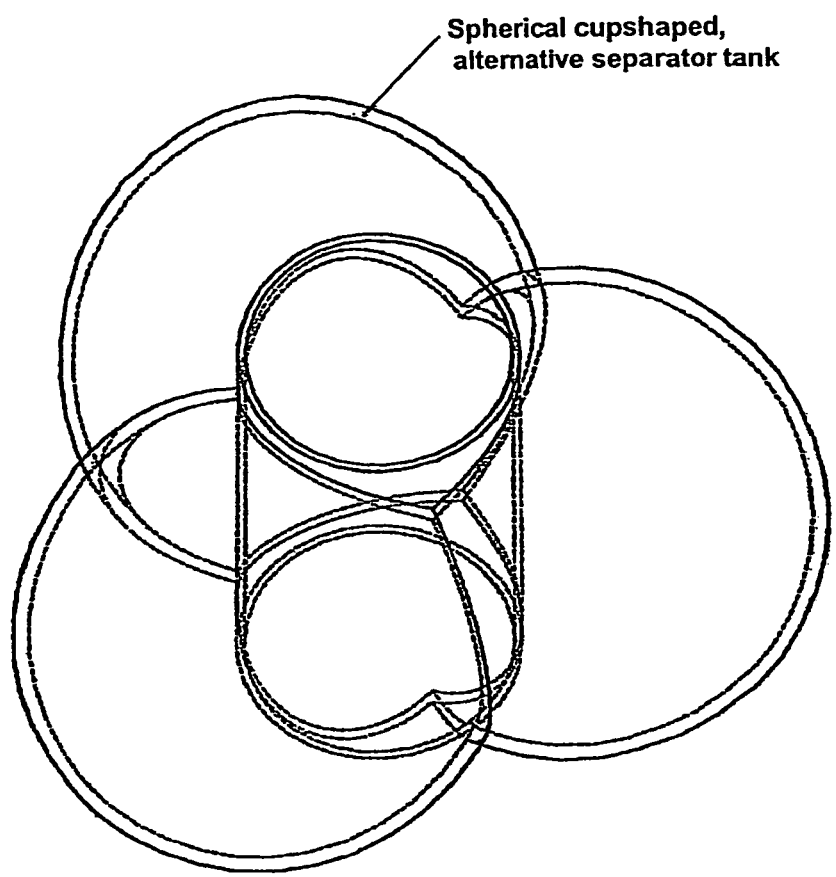
Spherical cupshaped, alternative separator tank
Fig. 17
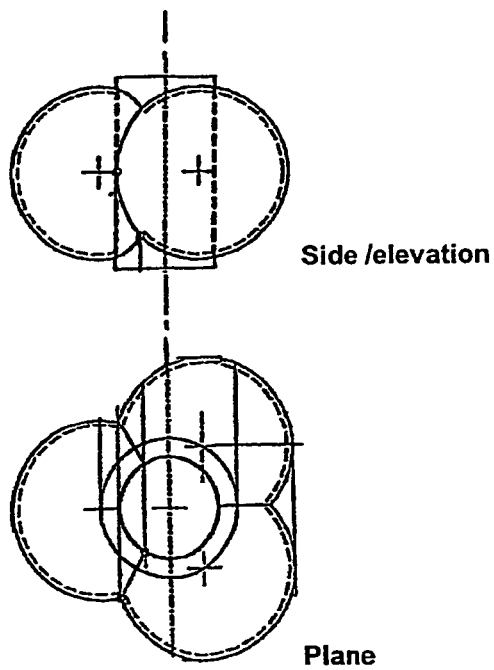
Side /elevation
Plane Compact Unit - Two Phase Pressure Boosting

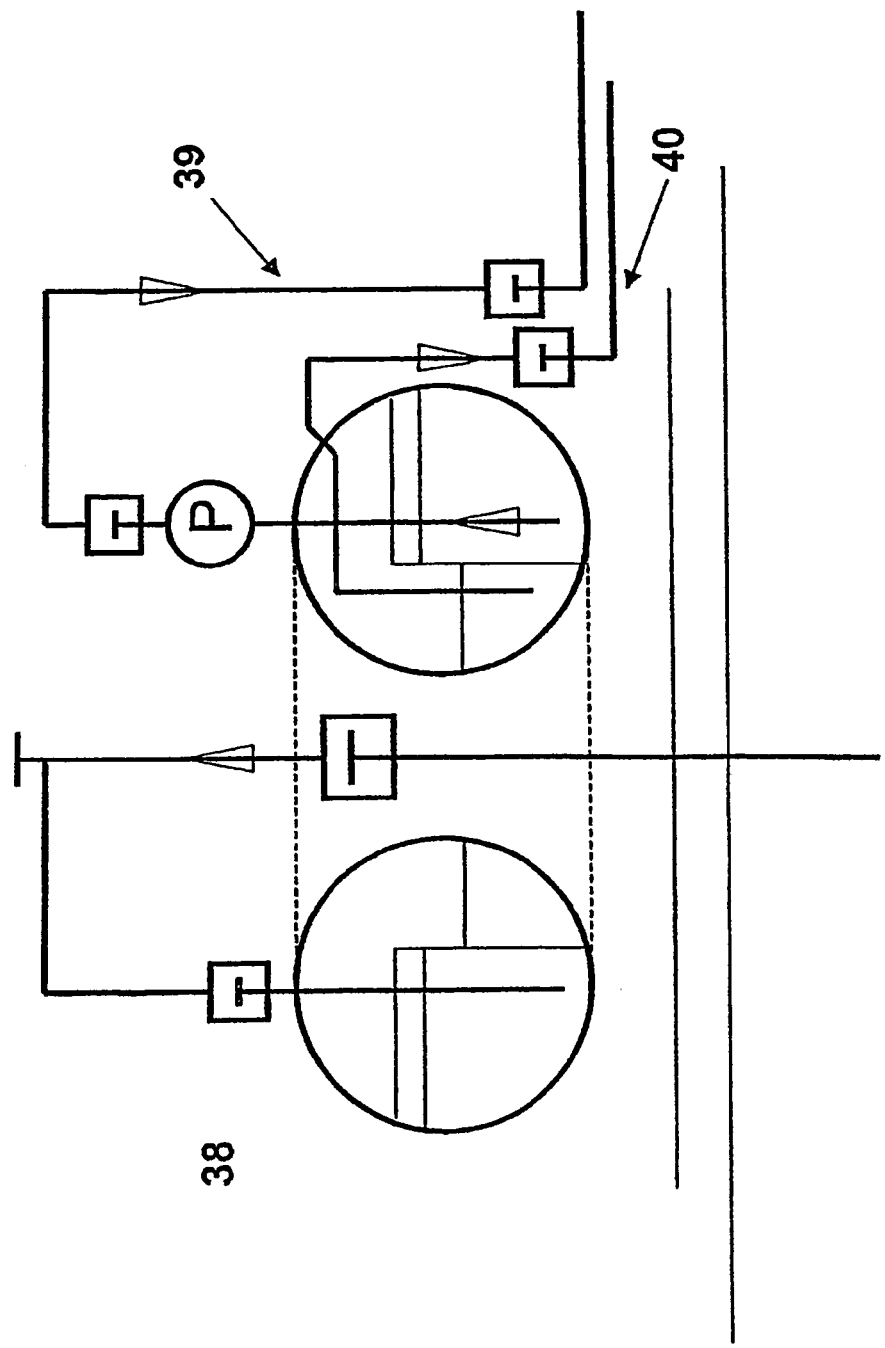

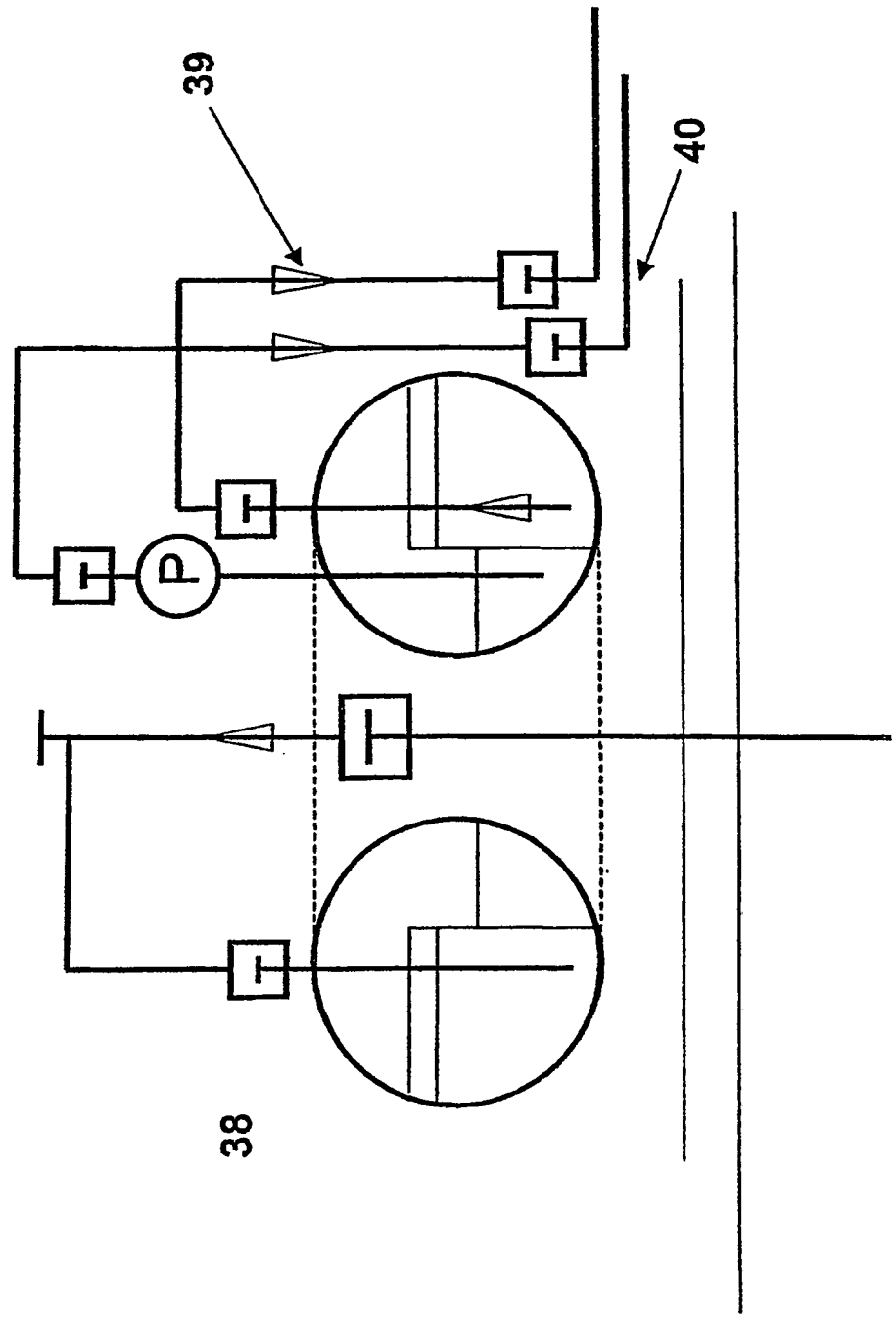

SUBSEA SEPARATION APPARATUS FOR TREATING CRUDE OIL COMPRISING A SEPARATOR MODULE WITH A SEPARATOR TANK

BACKGROUND OF THE INVENTION

1. Field of the Invention

The present invention concerns a subsea separation apparatus for treating crude oil comprising a separator module with a separator tank for the separation of water, gas, sand and crude oil from fluids flowing from a well. The apparatus or plant is designed to be placed on the seabed adjacent to, or on the well.

2. Description of Related Art

During the exploitation of oil and gas offshore, the produced fluids are usually led to a plant, for instance on an offshore platform, for the separation of the various phases of the fluid. These phases mainly include hydrocarbons, water, and in some cases, sand. The separation is usually performed with conventional separation equipment such as hydrocyclones and sedimentation tanks.

However, there are disadvantages connected to placing such separation equipment on offshore platforms. In many cases, the platforms impose limitations upon the weight and other design parameters of such plants. Risers and other equipment for bringing the well fluids to the platform and plant must be dimensioned to lead larger amounts of fluid to the platform than are to be produced. In addition, any reinjection of water into the well will require a lot of additional equipment for leading separated water down into the well. Alternatively, cleaned, but still oil containing water may be dumped directly into the sea, but this is problematic in areas sensitive to pollution.

It has therefore been suggested to place the separation plant on the seabed. This reduces the requirement for surface placed plants, and the need to transport fluids to the surface is reduced by the same amount as the water fraction in the fluid.

Such subsea plants known. For instance, Norwegian Patent NO 304388 which describes a method and an apparatus for the separation of a hydrocarbon flow on the seabed. The patent describes a subsea plant for the separation of crude oil fractions. The solution primarily concerns an arrangement and a method for sand processing, and appears limited to the separation of sand in produced water. The processing of sand takes place in the arrangement after pressurization. The sand is taken out downstream of the separator, where the water has a lower pressure. A water injection pump is used to increase the pressure to a pressure just over the pressure in the separator tank to force the sand to flow into the oil and gas export line. The disadvantage of this is that the pump must circulate sand containing water, which involves a considerable risk for increased wear with correspondingly high maintenance frequency. This is very cost intensive.

The handling of sand production is a common problem for underwater separation plants. Norwegian patent NO B1 172555 describes an underwater station for the handling and transport of a well flow. The underwater station is placed on the seabed and is intended to separate crude oil fractions in a manner similar to the present invention. In particular, a multiphase flow is transformed to two phases, a gas phase and a liquid phase, such that the flow as a whole can be moved by means of a single phase pump and a gas compressor.

Hence, the separation is primarily motivated by the transporting needs, meaning that a known single phase compression technology for pressurization allows the transfer of the well flow over greater distances than in the case of a pressure drop driven transport. It appears that the pump is mounted directly under the separator, and the compressor is mounted directly over the separator, in a vertical assembly. However, the present invention includes a three-phase separation where gas, oil, and water are treated with the purpose of removing the water fraction.

Norwegian Patent NO B1 309587 shows an apparatus for the separation of an oil/liquid phase from a gas phase in a well head fluid. The patent describes an arrangement for centrifugal separation that either can be placed at the surface or as a part of a subsea plant, for two-phase separation of crude oil or wet gas.

The apparatus is intended to inflict gravitational forces on the well fluid beyond normal gravitation (g), with the purpose of being able to part the liquid phase from the gas phase quickly, that is two-phase separation.

BRIEF SUMMARY OF THE INVENTION

The present invention involves a gravitational separation where the separation is driven with approximately one times the gravitational force constant, 1×g, with the purpose of splitting or dividing crude oil into three phases.

Accordingly, the present invention concerns a subsea separation apparatus with a separator tank having the features discussed herein.

The separation apparatus or the separation plant with a separator tank according to the invention is designed for the separation of water, gas, sand and crude oil from fluids flowing from a well. The separator tank and separator plant is furthermore intended to be placed on the seabed, preferably directly on a well head used as a water injection well, with a supply flow of well fluid from a neighbouring production well or a collection of such wells. Alternatively, the well head that the separation plant is placed over may be a production well, or may include production tubing both for production and water injection, a so called "multiple tubing completion".

The pressure equipment is preferably placed upstream in relation to the nodes where the well fluid is merged, and downstream close to the production well. The purpose of this arrangement is to exploit the heat of the crude oil, with a temperature as high as possible, to ensure the best possible conditions for the separation of water from the crude oil. The equipment may be placed on existing well heads and can easily be connected or disconnected as a module.

The separator tank of the plant is designed substantially concentrically about the well head with necessary components or modules placed around it, above it or below, such that the center of gravity of the plant is placed substantially directly above or concentrically around the well head. The separator tank has an opening hole extending there through, essentially in the middle, allowing the well head below to extend through the hole and create a substantially rotationally symmetrical volume. Alternatively, a single phase pump, a multiple phase pump or compressor may be placed in the opening extending through the tank.

Such plants may include a number of elements and modules. Examples of such elements are a permanent guide base (PGB), a guide base or flow base, a temporary guide base (TGB) or base frame, a separator module, a well head Christmas tree, a filter unit, connection equipment, oil-in-water sensors, connecting frames, permanent bases for guidelines or guide posts, injection pumps, transformers, choke bridge modules for processed water, a hydrocyclone for sand separation, a Christmas tree for water injection a production Christmas tree, pumps for cast off oil, control mechanisms for Christmas trees, a hydrocyclone for oil separation etc.

The elements are preferably built as modules that are placed on the seabed and assembled in a certain order.

These elements or modules are preferably dimensioned according to limitations in connection with installation of the equipment. These limitations are typically the size of the opening of the lower deck or "moonpool" on launching, and the size of the maintenance vessels.

The plant enables the separated water to be directly reinjected into the well bore, in the latter case of a multiple tube completion. Alternatively, separated water may be dumped on the seabed, given a preceding oil separating treatment to reduce the oil content of the separated water. In both cases, transport of water to the surface is avoided. The plant, if it is adapted for reinjection, may include a downstream pump with possibly a hydrocyclone (for sand separation) in front. The plant may include a hydrocyclone (for oil separation) in the situation where water is dumped at the seabed. In the latter case, it may be necessary to provide an oil-in-water probe or sensor for the control of the oil content.

Direct reinjection at the well head is an environmentally favorable solution. The plant is preferably placed directly on the well head.

The plant is adapted for the connection of pipelines to stabable branch pipes on the plant, and for the connection of a power cable in addition to the placement of a subsea transformer. It can furthermore include connections for a control cable and connections for the placement of control and monitoring equipment.

The plant may include a protective structure of glass reinforced plastic (GRP) or of another suitable material, that makes it possible to trawl over the unit and to protect the plant.

The separator tank according to the invention is preferably torus shaped or in any other way assembled of pressure shell elements with dually curved surfaces. The solution according to the invention involves the separation of crude oil to get rid of the water fraction by directly dumping this fraction to the sea, or reinjecting to the reservoir by means of an injection well. The torus or ring shaped separator tank is a gravitational separator tank for the separation of process water. The injection point at the well head Christmas tree is preferably placed immediately adjacent to the center of the separator tank. The sand is washed away ahead of the separator tank by a liquid/gas/sand cyclone ahead of the inlet of the separation tank. In other words, the invention involves sand separation from the crude oil phase by a gas/liquid/sand cyclone at the inlet. The separator tank has no rotating parts, but includes internal guide vanes or plates leading the well flow in a circle around the injection well head, and can be cochleate or resemble a snail shell. The torus shaped separator tank itself is adapted for three-phase separation of the well flow. The outer measurements of the tank are reduced to a minimum to make retrieval of the tank to the surface during maintenance operations offshore easier and more cost effective.

The crude oil preferably flows substantially horizontally through the tank and passes a sector one or several times around the opening in the middle. The central opening extending through the tank is available for process equipment for crude oil. This process equipment may include a water injection Christmas tree, a production Christmas tree, or a choke bridge module.

The tank may be adapted with a center tube for guidlines less stabbing and assembly of the well head Christmas tree in the opening going there through. The tank is designed as a pressure vessel and has an upper and a lower shell connected internally with a thick-walled tube, and externally with a double layer ring structure. The tank may, for instance, be made of a metal material or a polymer laminate (GRP).

The tank is designed to, relatively speaking, have a greater pressure resistance towards internal pressure, than towards external pressure, in such a way that loss of internal pressure will not result in a collapse of the tank, with the effect that retrieval of the installed equipment to the surface is prevented.

The separator tank is internally designed as a labyrinth or a snail shell and is cochleate. The inlet is at the inner side by the center, and the flowing cross section may be progressively increasing such that the velocity component gradually is reduced. At the end of the snail shell, there is a standard well wall for collecting the oil fraction pouring over this wall. Separated oil is retrieved behind this wall. A sink for separated water is placed ahead of this wall. Fluid flow concerns are made during the design of the interior, primarily to increase retension time and to reduce turbulence.

The surrounding equipment of the tank, such as a pump for separated oil, hydrocyclones, a pump for separated water, and, in some cases, compressors for separated gas, is arranged such that tubular connections are radially configured and, therefore, have a minimum length. This is to reduce heat loss. The tank and tubing may be thermally insulated to improve the separation processes and to reduce the probability of ice plug creation.

The tank interior may include fixed level sensors to measure the level of the water/oil transition and oil/gas transition. Because the tank has outer measurements and a mass, accepting simpler retrieval, the level sensors may be integrated as fixed parts, and not as separate retrievable modules, which reduces the need for the use of passages in the pressure shell.

BRIEF DESCRIPTION OF THE DRAWINGS

FIG. 17 shows a cut through perspective view of still another embodiment of the separator tank according to the invention, where cup shells are used. Inserted in the figures are also two views showing the tank in side elevation and plan elevation;

FIG. 25a is a schematic diagram of a well head unit with a cross section of a separator tank according to the invention adapted for being placed on a production well, where the outlet for oil and outlet for pressurized water is shown; and FIG. 25b is a schematic diagram of a well head unit with a cross section of a separator tank according to the invention adapted for being placed on a production well, where an outlet for water and an outlet for pressurized oil/gas is shown.

DETAILED DESCRIPTION OF THE INVENTION

Figure 1:
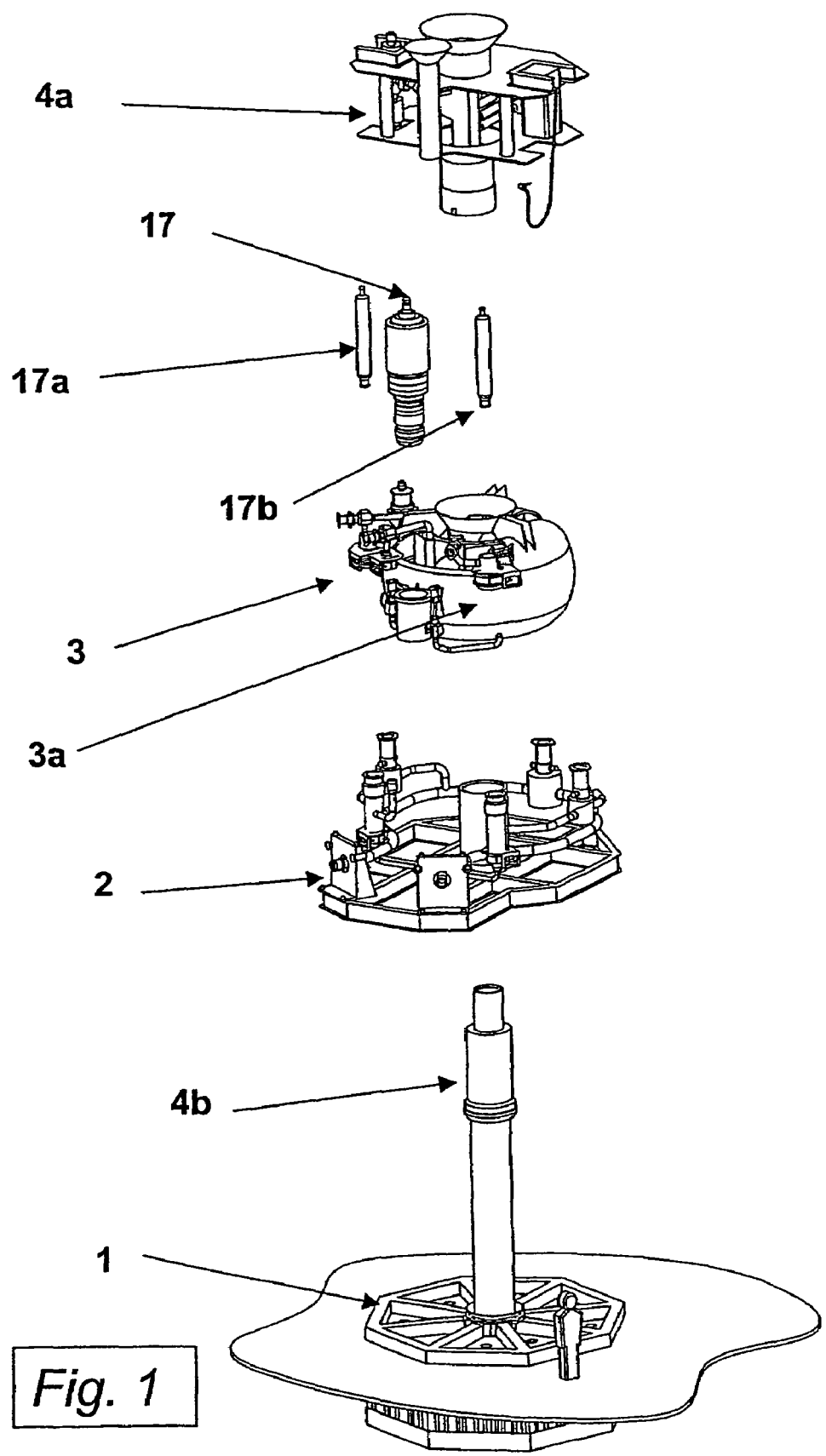
FIG. 1 is an exploded view of a separation plant with a separator module and a separator tank according to the invention.

The invention will now be described in greater detail with reference to the enclosed drawings, where similar reference numerals refer to similar components.

FIG. 1 is an example of a separation plant with a separator module 3 according to the invention, on a well head. The separation plant is shown with a valve tree or water injection tree 4a (shown as a guidelineless type) for the injection of separated water. The water injection tree 4a has inserts such as a hydrocyclone for gas/liquid and/or particle separation 17a, a hydrocyclone for oil separation and/or sand mixer 17b, a booster pump 17 for separated water, a manifold and guide frame for any guidelines or pillars called guide base or flow base 2 (PGB), a well head completion 4b, and a base frame 1 (TGB). The retrievable inserts (not shown on FIG. 1) may include sand cyclone modules, connection spools 6, water injection pumps, transformer modules, a ROV winch, control parts, a choke bridge module, a connecting point for an umbilical valve tree for water injection, etc.

Figure 2A:
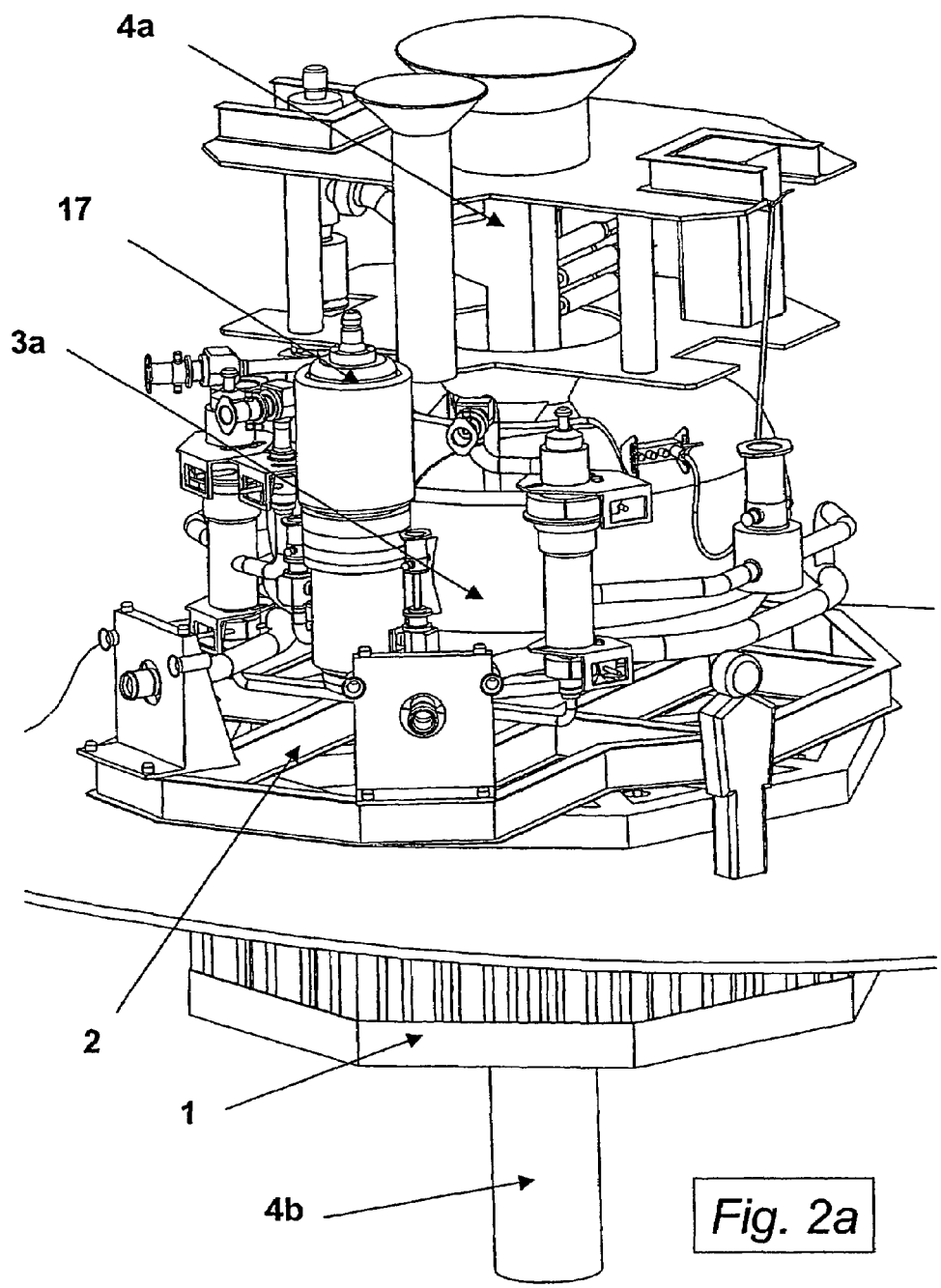
FIG. 2a shows the separation plant of FIG. 1 in a perspective view with cutouts from a first angle.
Figure 2B:
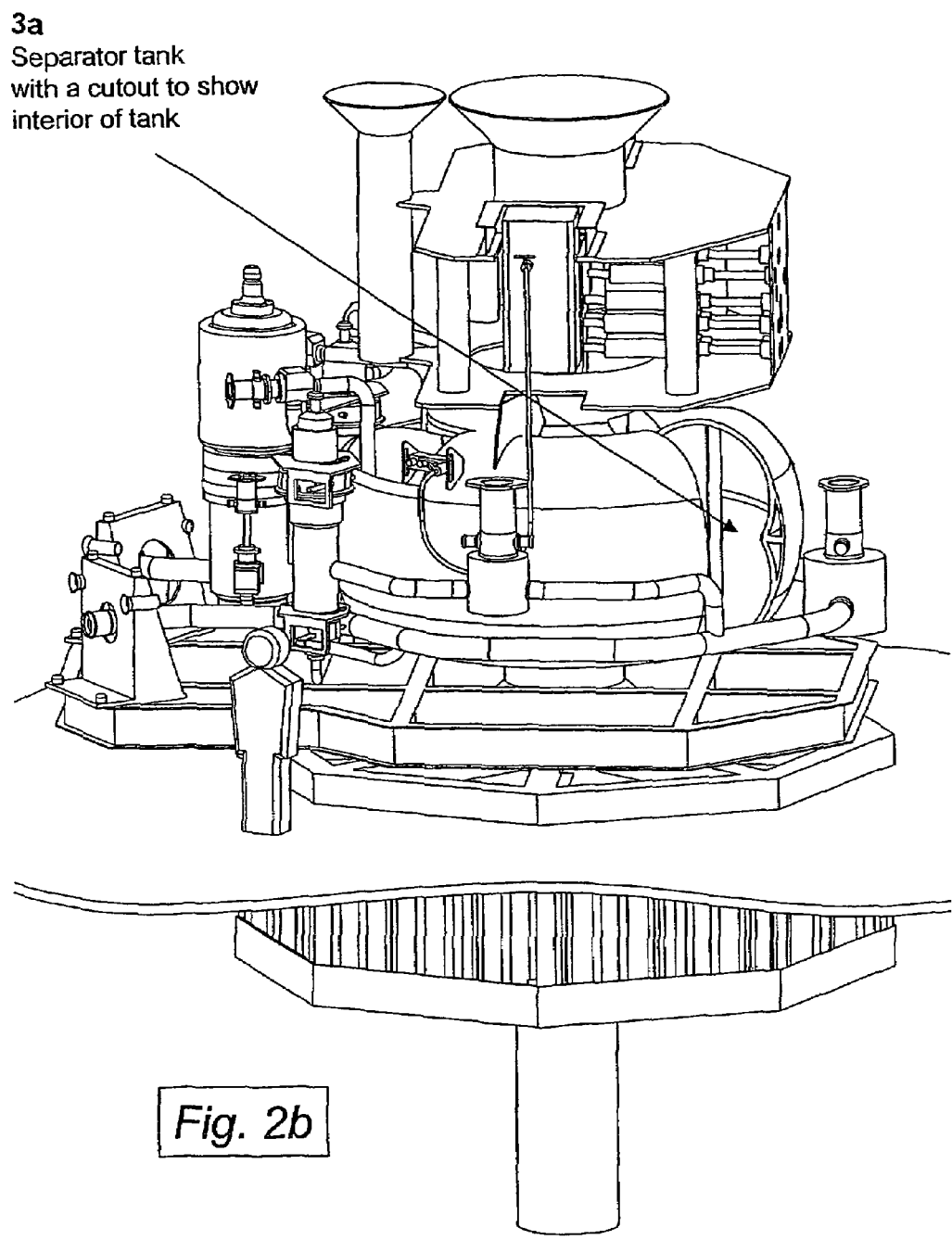
FIG. 2b shows the separation plant of FIG. 1 in perspective view with cutouts from a second angle.

FIGS. 2a and 2b show the parts of FIG. 1 assembled and placed on a well head on the seabed from various angles. The booster pump 17 for separated water and separator tank 3a are also shown.

Figure 3:
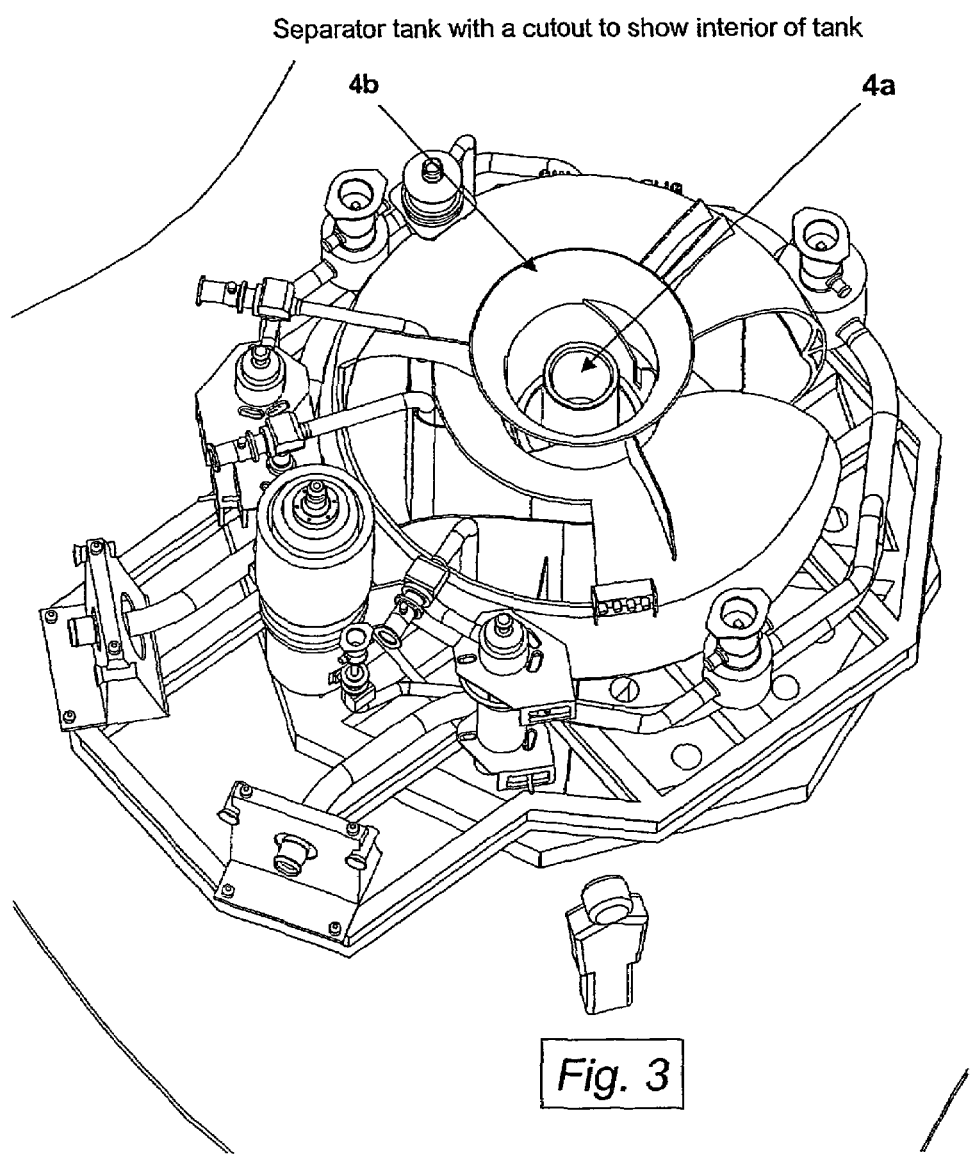
FIG. 3 shows a perspective view of a separation plant as shown in FIG. 1, but where the water injection-tree is removed to clearly show the separator tank, and where this is shown with cutouts.

FIG. 3 shows the partly cut through separator tank 3a placed on the connection frame which comprises the guide base. FIG. 3 shows the well completion 4b where the water injection tree 4a is removed to provide a better view towards a stabbing skirt or stearing funnel part of the separator tank 3a for the water injection tree 4a.

Figure 5:
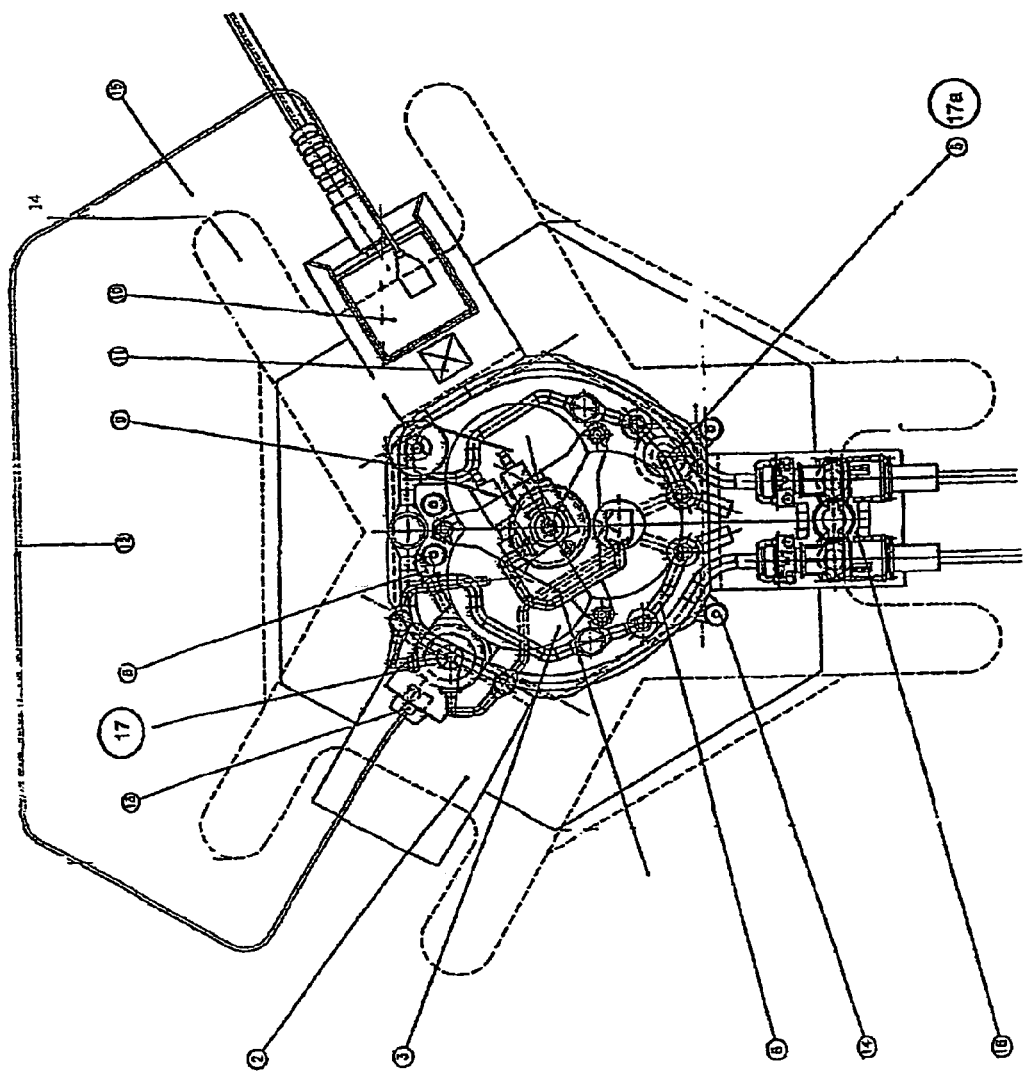
FIG. 5 is a plan view of the invention as shown on FIG. 4.
Figure 6:
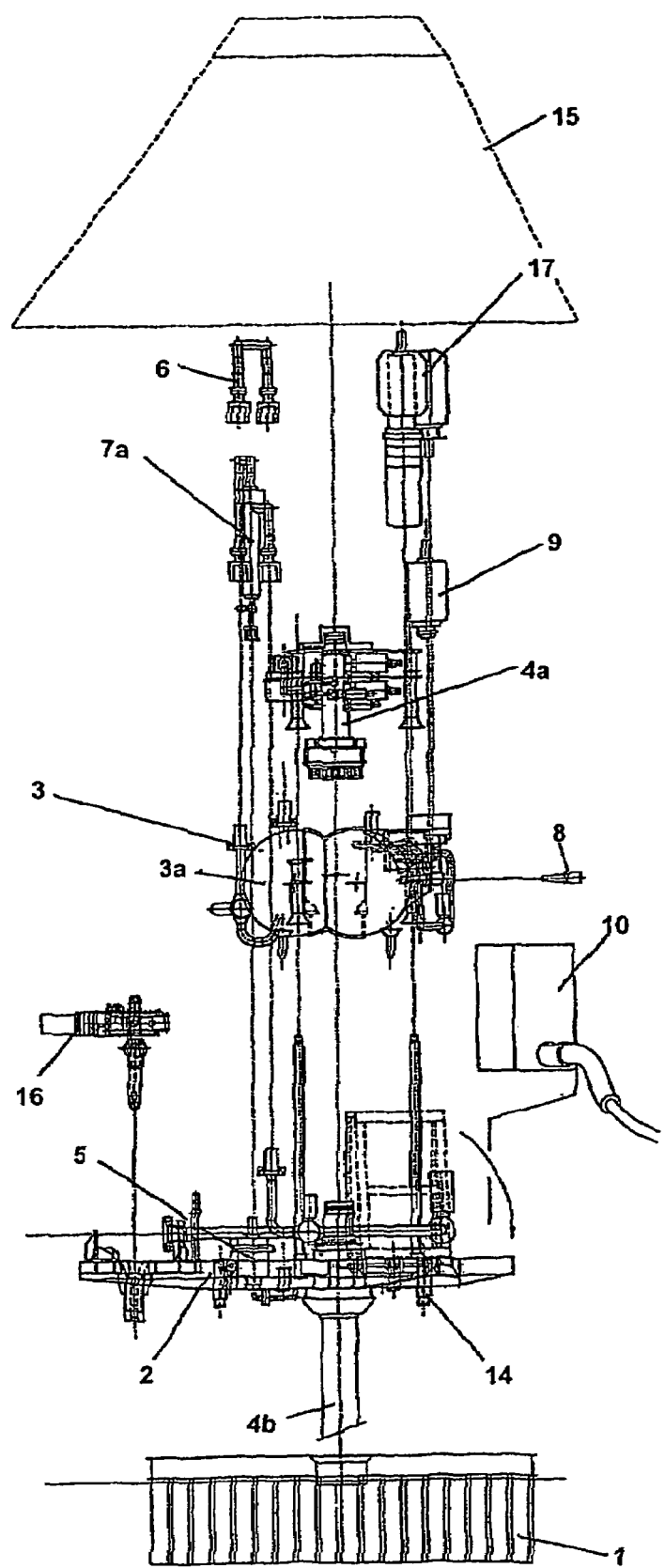
FIG. 6 is a side elevation of an exploded view of the invention as shown in FIGS. 4 and 5.
Figure 7:
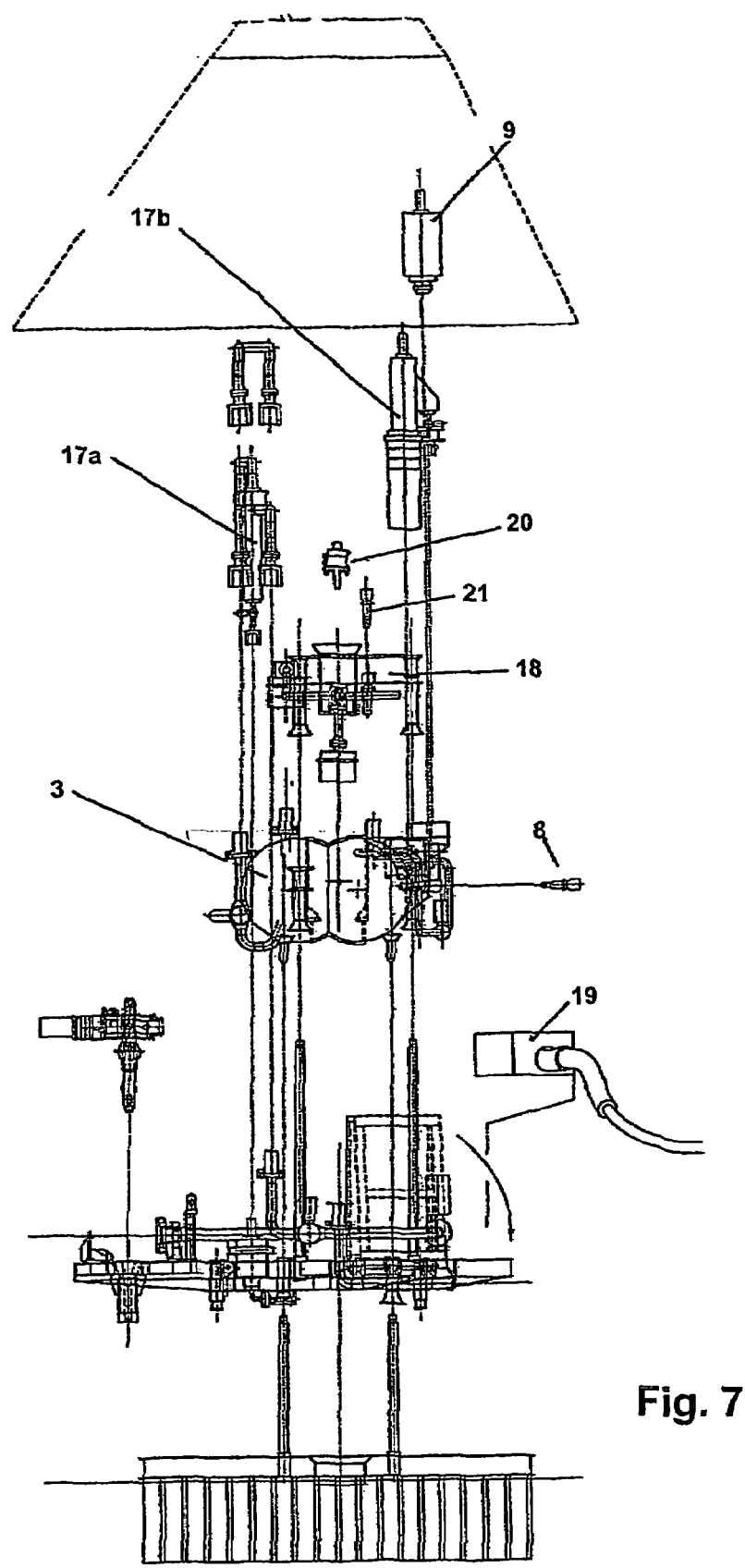
FIG. 7 is an exploded view of a separation plant according to another embodiment of the invention designed for the dumping of separated water on the sea bed, where the water injection tree is substituted by a choke bridge module.

FIGS. 4-10 show several embodiments of separation plants where separated water is reinjected directly into the well (the FIGS. 4, 5, 6, 8, 9 and 10), or is dumped to the sea bed (FIG. 7). The plant includes a gravitational separator tank 3a that is torus or doughnut shaped or in other ways adapted for concentric placement with the well head of the injection well, in the reinjection case. The separator module 3 may be supported by, for instance, a well head completion 4b (shown in FIGS. 6 and 10), and/or a modified permanent base, called guide base 2 or flow base (PGB). In both cases, this provides a concentric support in relation to the injection well, which is practical to reduce the requirements for foundations, and for reducing the dimensions of the base frame 1 to a structure with a minimal area, for instance modified to include a vertical, sea bed penetrating skirt.

For reinjection (shown in FIG. 6) is a related water injection-tree 4a placed as a coupling with connection directly between the outlet for separated water from the separator tank 3a and the well head itself. To reduce the vertical height of the assembly, the connection spool on the valve tree may be placed higher than the well head coupling. The injection tree 4a may include four, three or no (guidelineless) stearing posts or guidelines. If stearing posts are used, they are placed in a favorable way in relation to the separator tank 3a lying below. The direct connection allows separated water to flow from the separator tank 3a and directly to the valve tree. Solutions suggested by others frequently involve a considerable distance between the tank and the injection tree. This increases the risk that the separated water, that often contains residue of hydrocarbon, is cooled such that hydrate ice plugs are created in the tube. The solution according to the invention reduces this risk considerably. Furthermore, the solution results in a reduced number of valves and connections and, accordingly, the number of seals and potential leaks.

The plant has preferably standardized components for both the case with direct reinjection, and the case where process water is dumped at the sea bed. This makes it possible to use exchangeable components for the two different cases. This has many advantages in connection with the equipment costs, fabrication time, production flexibility and reduced stock holding of spare components for the operator. Examples of such components are separator tank 3a, hydrocyclone for particle separation 17a, connection spools 6, and flow base/guide base (PGB) 2 with flow tubes, and a connection frame and stearing posts, in the latter case where guidelines are used.

The guide base 2 may be modified to control the flow of separated water in the case where separated water is dumped at the sea bed. The plant may employ an outlet for separated water from the separator module 3 having a design that both can accept of the type pump/motor insert (in the case of reinjection), or a hydrocyclone for oil separation (in the case dumping at the sea bed). Both inserts may use of a system with radially acting sealing arrangements.

The illustrated arrangement employs placing of the modules in layers. Relative reliability considerations are the basis for the placement of the individual components in the function controlled arrangement, in which there is a vertical connection or "stack-up". For instance, ROV-operated valves may for instance be placed in the guide base 2 along with piping systems and, alternatively, a collector tank for sand 5, see the hydrocyclone for particle separation 17a. The separator module 3 that is supported by the guide base 2 includes remotely operated valves. Above the separator tank 3, vertical connection spools 6 are used as tubular connections. These connect the tubing system in the guide base 2 with the separator tank 3a. On the inlet side, the tubular connections 6 may include a hydrocyclone for particle separation 17a, as a relatively high degree of mechanical wear results in expected high frequency of replacement. The outlet side for separated water also employs connection spools for the tubular connections 6, and reference is made to the water injection-tree 4a and the choke bridge module 18, used in the cases with direct reinjection and dumping at the sea bed, respectively. The water injection-tree 4a can be said to have a double function: as a connecting element, corresponding tubular connection 6; and as a valve block for well head valves necessary for the injection function. The choke bridge module 18 is thought to contain oil-in-water sensing instruments 22 and control/choke valves, where one, some or all of these components are either separately retrievable, or fixedly mounted in the module.

Figure 9:
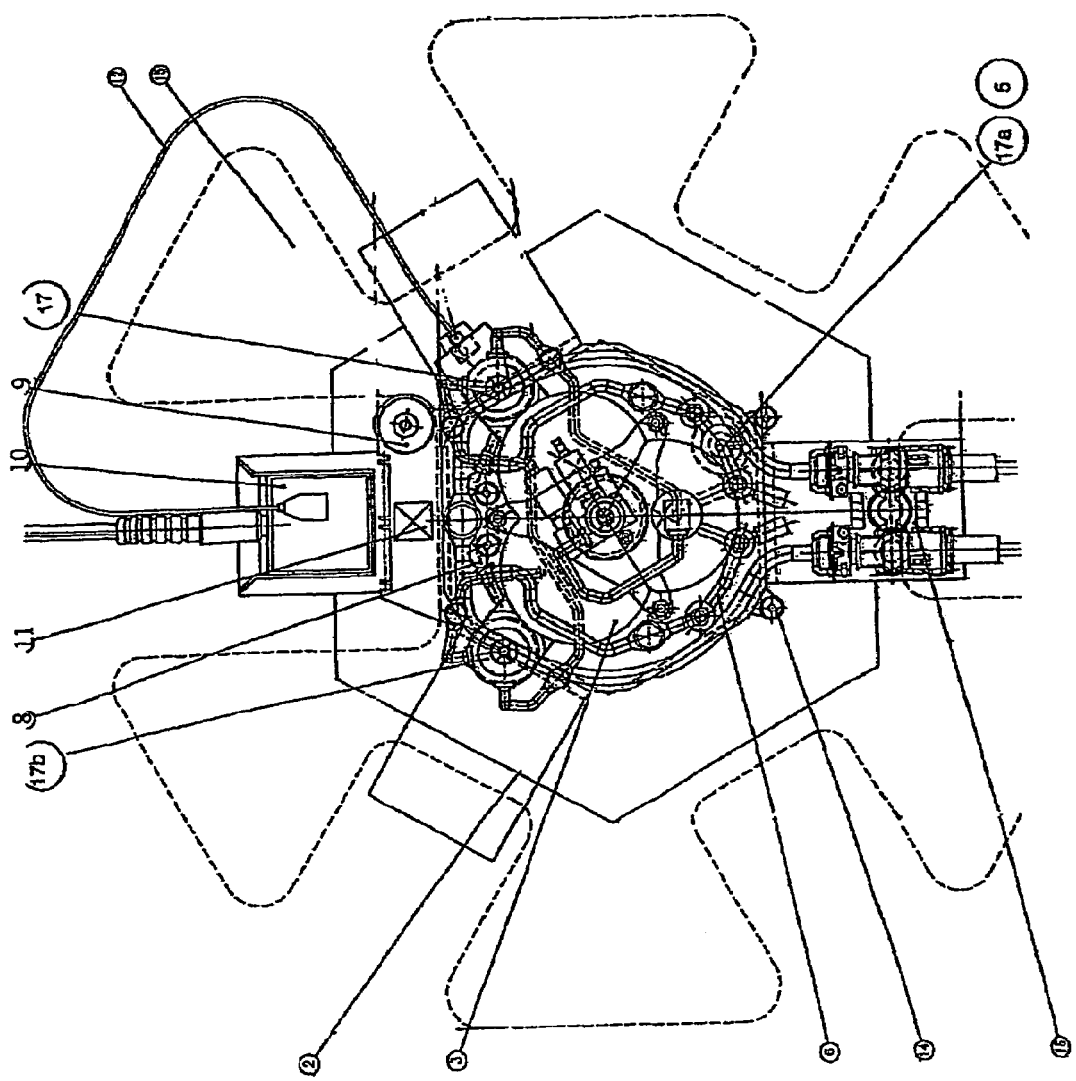
FIG. 9 is a plan view of the separation plant shown on FIG. 8.

A very important feature is preventing hydrate creation in tubes that contain water that continuously or periodically contains hydrocarbons. This is called "cold spots". Cold spots are cold places in the tubular system that may cause hydrate creation, with the relating hazard of clogged tubes. By leading tubes through the separator tank 3, as shown in FIGS. 5 and 9, the heat from the crude oil, stored internally in the tank, may be used to prevent or retard hydrate creation.

In FIGS. 4, 5, 8, and 9, protective structures 12 with built in opportunity for access to the plant are shown. The arrangement that principally involves a fixed angular distribution between pull-in points and access corridors for ROV is shown with a 120° distribution with three pull-in points: one for a pipeline, one for a power cable for a transformer, and one for power connections towards a pump insert, respectively. This provides for a design with a more effective protective structure, in that a rotationally symmetrical embodiment with three repelling corners may be used. All of, or parts of, the protective structure may include pivotal elements, or lids, of fiber glass reinforced plastic (GRP).

Figure 4:
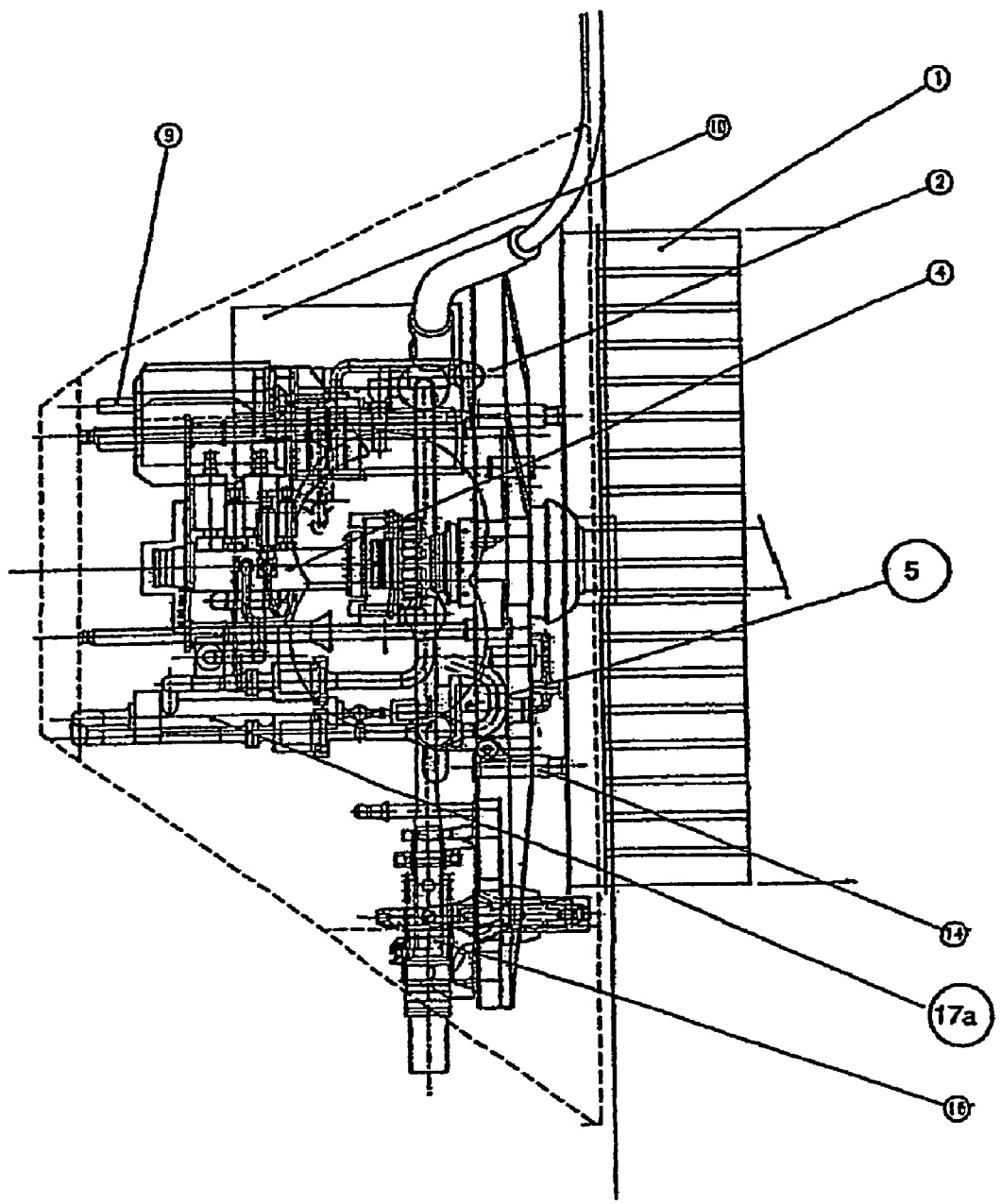
FIG. 4 is a side elevation of a separation plant according to another embodiment of the invention intended for water injection of separated water down into a well, with a corresponding water injection tree.

FIG. 4 is a side elevation of a separation plant according to the invention placed on a well head on a sea bed. The well head is intended for water injection of separated water back into the well. In the figure, there is shown a base frame 1 and a guide base 2, with or without guidelines and guide posts, placed on the base frame 1. The guide base 2 may also include a connecting frame or flowline termination 16, tubular system with appurtenant valves and parts of the inlets and outlet cyclones, for instance sand trap 5, on the inlet side. Furthermore, there is shown a Christmas tree for water injection 4a, a levelling mechanism 14, a hydrocyclone for sand separation 17a with sand trap 5, and a connecting frame, a transformer module 10, and a control pod 9 for the separator.

FIG. 5 is a plan view of the separation plant of FIG. 4, showing the placement of the components in relation to each other on the base frame 1. FIG. 5 also shows a power and control jumper 12 and a termination 13 for the power and control jumper. Furthermore, there is shown a tubular connection (rigid spool) 6, an injection pump insert 17, an oil-in-water sensor 8, the control pod 9 for the separator module 3, and the transformer module 10. The tubular connection 6 may include an oil-in-water sensor 8. A protective structure 15 is shown with a dashed line.

FIG. 6 is an exploded view of the embodiment shown on the FIGS. 4 and 5. A base frame (TGB) 1 supports a modified permanent guide base 2 for the tube and valve arrangement, including guide posts for the condition where guidelines are used, in addition to parts of the hydrocyclone 17a with the sand trap 5, and a hinged connection frame. A VE-MEC-flowline termination 16 is shown connected to the guide base 2. Furthermore, FIG. 6 shows how a hydrocyclone for sand separation 17a, the tubular connection 6, the injection pump insert 17, the control pod 9 for the separator, the water injection-tree for processed water 4a, the oil-in-water sensor 8, and the transformer module 10, all are assembled for the separator plant of the invention. The protective structure 15 is shown with a dashed line. This protective structure 15 may be made of fiber glass reinforced plastic (GRP).

FIG. 7 is an exploded view of a plant with many similar features to the one shown on FIG. 6, but shows an embodiment of the plant adapted for the dumping of separated water at the sea bed. FIG. 7 shows that this separator plant also includes a hydrocyclone for sand separation (inlet) 17a, a control pod 9, a hydrocyclone for oil separation (outlet) with a turbine driven pump 17b, for separated oil from separated water, an outlet for separated water directly to the sea after the oil-in-water sensor 8, a choke bridge module 18, and a connection 19 for an umbilical cord. A separately retrievable choke valve or choke insert 20 is also shown. The separator module 3 may furthermore support its own vertically retrievable modules. In the case of direct injection and dumping at the sea bed, the injection pump insert 17, and the hydrocyclone for oil separation 17b are placed by the outlet for separated water and from the separator tank, respectively.

Figure 8:
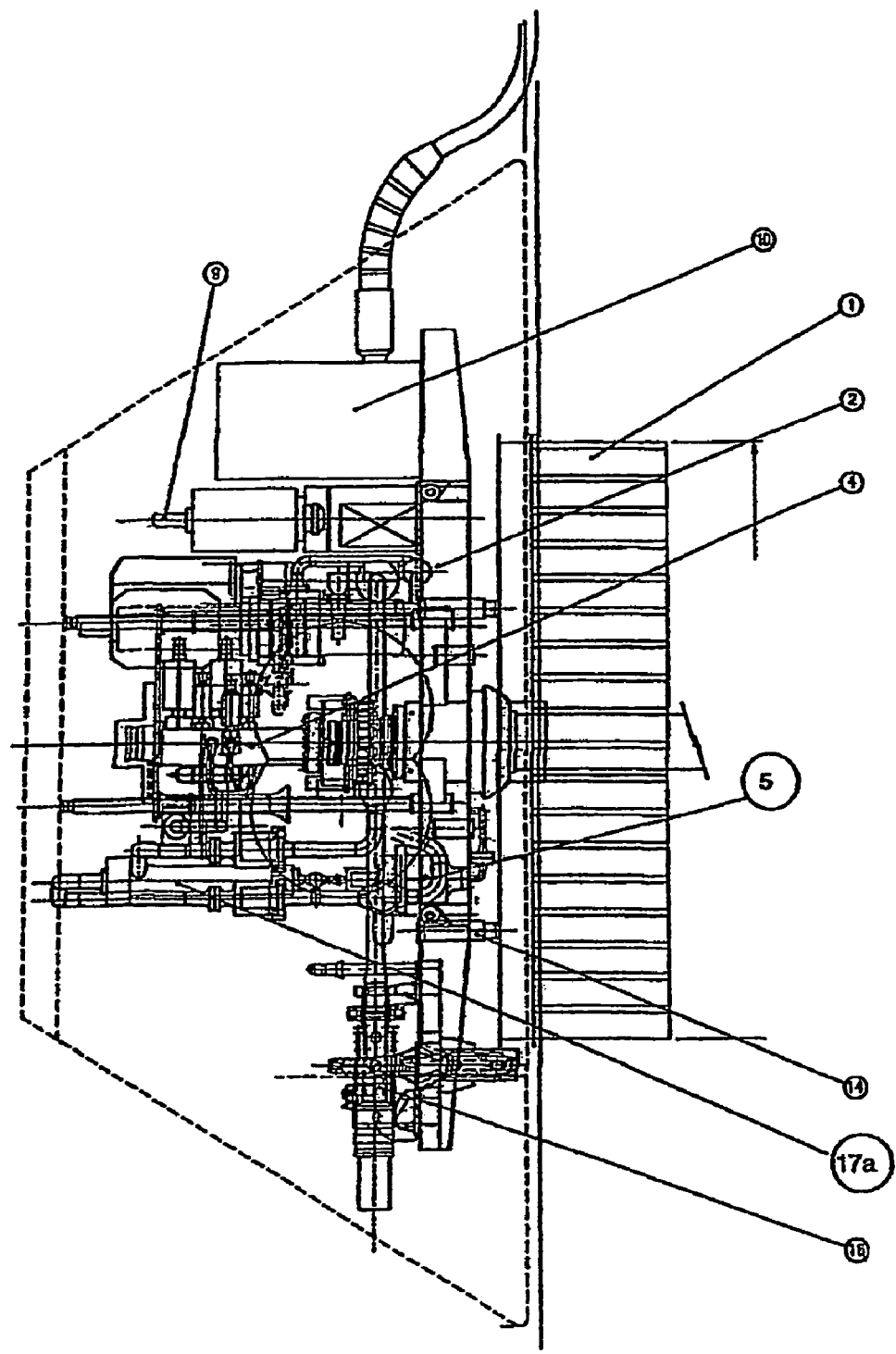
FIG. 8 is a side elevation of a separation plant according to a further embodiment of the invention with a hydrocyclone for oil separation, intended for water injection, with a water injection tree.
Figure 10:
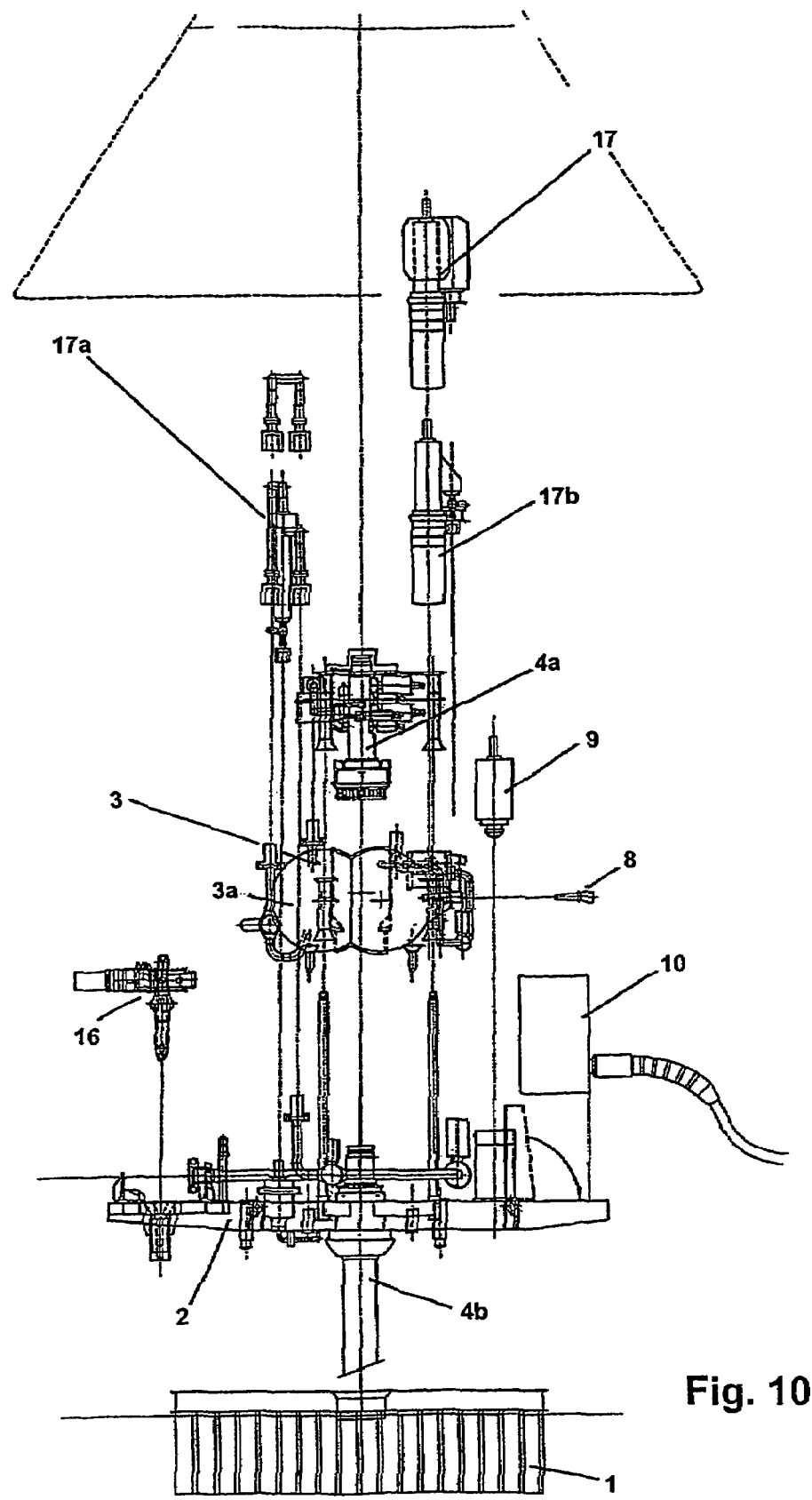
FIG. 10 is an exploded view of the separation plant shown in FIGS. 8 and 9.

FIGS. 8, 9, and 10 show an arrangement for direct reinjection where also a hydrocyclone for oil separation of water out from the separator tank is placed at the outlet. There are possible uses of the invention where the composition of the produced fluid in relation to the volume of the separator tank 3, which decides the time of residence in the tank, means that maximum oil content, typically 300-1000 ppm, can not be expected after the gravitational separation in the tank. It is therefore desirable to perform a pre-treatment, before the injection pump-insert or the booster pump 17 for separated water, to remove the oil in the separated water. This is done by using a hydrocyclone for oil separation 17b, as shown in the figures. The hydrocyclones 17a and 17b, may be separately retrievable in that they are placed in the same type of fixture as the water injection pump insert 17.

FIGS. 8 and 9 are plan and side elevations of a separation plant corresponding to the one shown in FIGS. 4 and 5, but where the separation plant, as mentioned, also includes a hydrocyclone for oil separation 17b on the outlet side. This hydrocyclone may include a water turbine driven pump for refused oil.

FIG. 10 is an exploded view of the plant shown in FIGS. 8 and 9, where the hydrocyclone with turbine driven pump 17b for separated oil is clearly shown.

Figure 11:
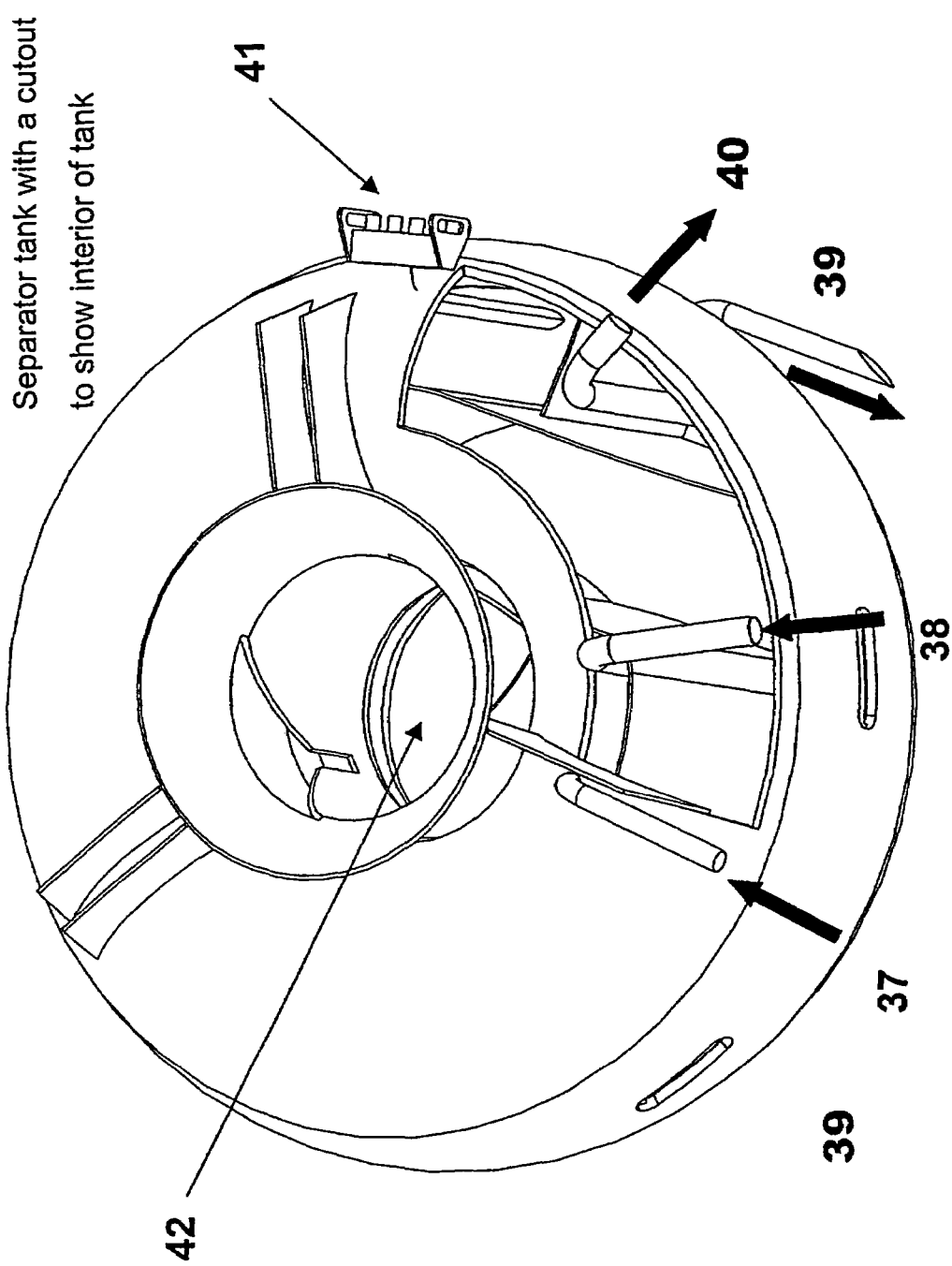
FIG. 11 is a partly cut through perspective view of an embodiment of a separator tank according to the invention.

FIGS. 11 to 15 show the separator tank (shown as 3a in the figures mentioned above) according to one embodiment of the invention. FIG. 11 shows that the separator tank includes a center hole or an opening 42 for the well head 4b located substantially at the center of the separator tank. The separator tank is substantially torus or ring shaped, and the center hole 42 for the well head is placed substantially at the center of gravity of the tank. In the figures there is shown a gas inlet 37 from the hydrocyclone 17a, a liquid inlet 38 from the same cyclone, an outlet for process water 39, an outlet 40, for oil and a level indicator 41.

FIGS. 12, 13, 14 and 15 show the separator tank in further detail. The illustrated tank is a torus shaped subsea tank for three-phase separation of the well flow, where the outer measurements of the tank are reduced to a minimum to make retrieval of the tank during maintenance operations offshore easier and more cost effective.

The tank for three phase separation of the well flow may have a stabbing skirt placed at the top of the center tube, adapted for guideline less installation of a Christmas tree. This is particularly favorable for installations of arrangements in deep water (>600 m w.d.). The tank is designed as a pressure vessel and may have an upper and a lower shell connected internally with a thick walled tube and externally with a double walled, ring structure. The tank is designed to be relatively stronger for internal pressure, compared to external pressure such that implosion with any loss of internal pressure shall not result in deflection or collapse of the tank, preventing retrieval to the surface.

The tank may include an internal arrangement 44, 45 made as a "labyrinth" or a "snail shell". The inlet is placed innermost at the center, and the cross section of the flow is progressively increasing such that the velocity of the flowing crude oil gradually is reduced. At the end of the "snail shell" a standard well wall is placed. Separated oil goes out behind the well wall, and separated water goes out in front, through a sink at the bottom of the tank. The design of the internal arrangement is made in view of technical flow concerns such as minimizing the time of residence and minimizing turbulence.

The separator tank has thereto affixed surrounding equipment such as a pump (for separated water), hydrocyclones and compressors (for separated gas). These elements are arranged such that tube connections are radially oriented, and have thereby the shortest possible length to reduce heat loss. The tank and the tubes are in addition thermally insulated to improve the separation process, and reduce the hazard of the creation of hydrate ice plugs inside the tubes.

The internal arrangement of the separation tank may include permanently installed level sensors to part liquid/gas and liquid/liquid (oil/water). As the tank has external measurements and a mass allowing simple retrieval to the surface, the level sensors may be integrated as permanently installed parts, as opposed to separately retrievable modules. In this way, unnecessary use of space and passages such as flange joints is avoided.

Figure 12:
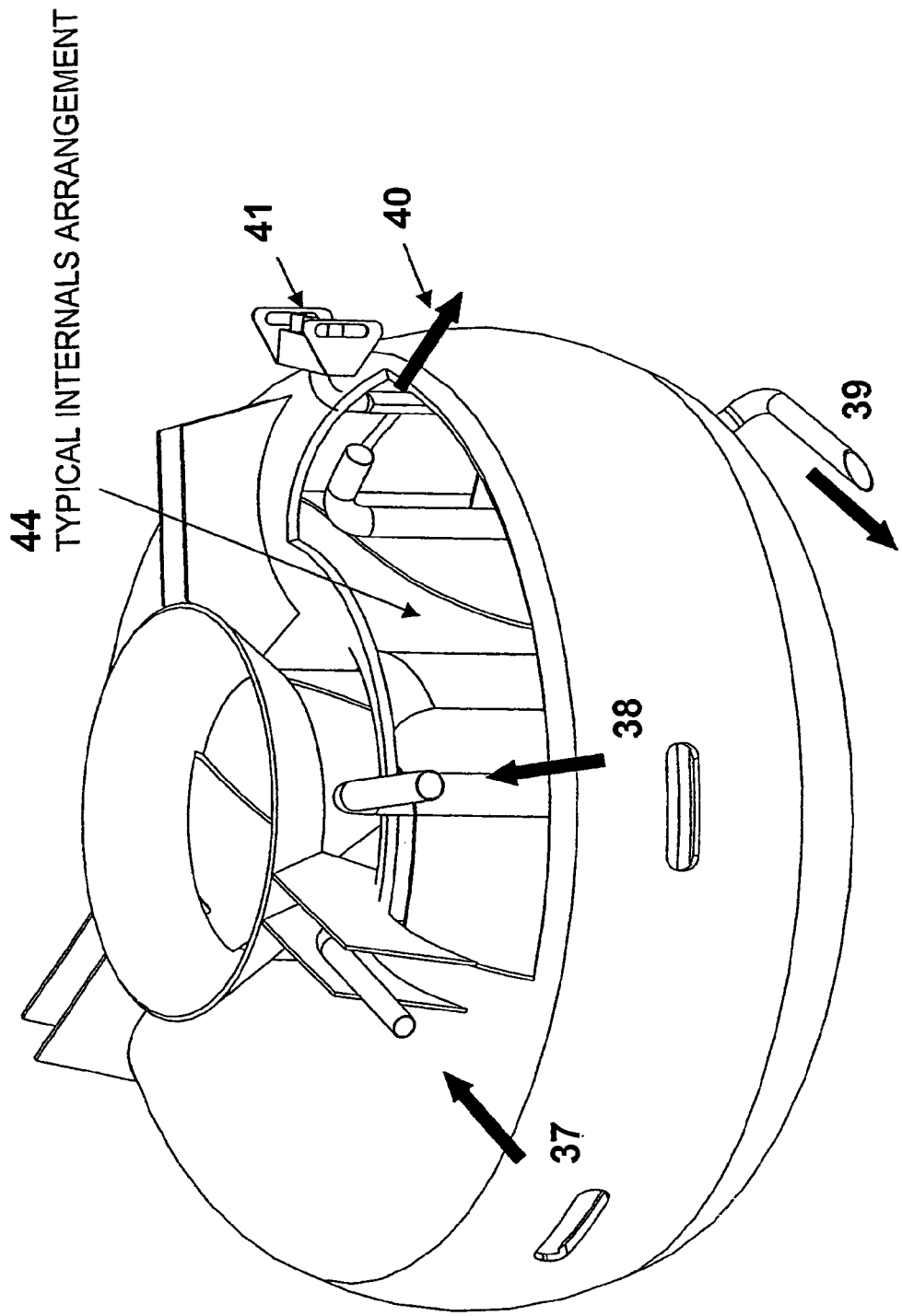
FIG. 12 is the separator tank shown in FIG. 11 from a different angle.

FIG. 12 shows an example of an internal arrangement 44 in the tank.

Figure 13:
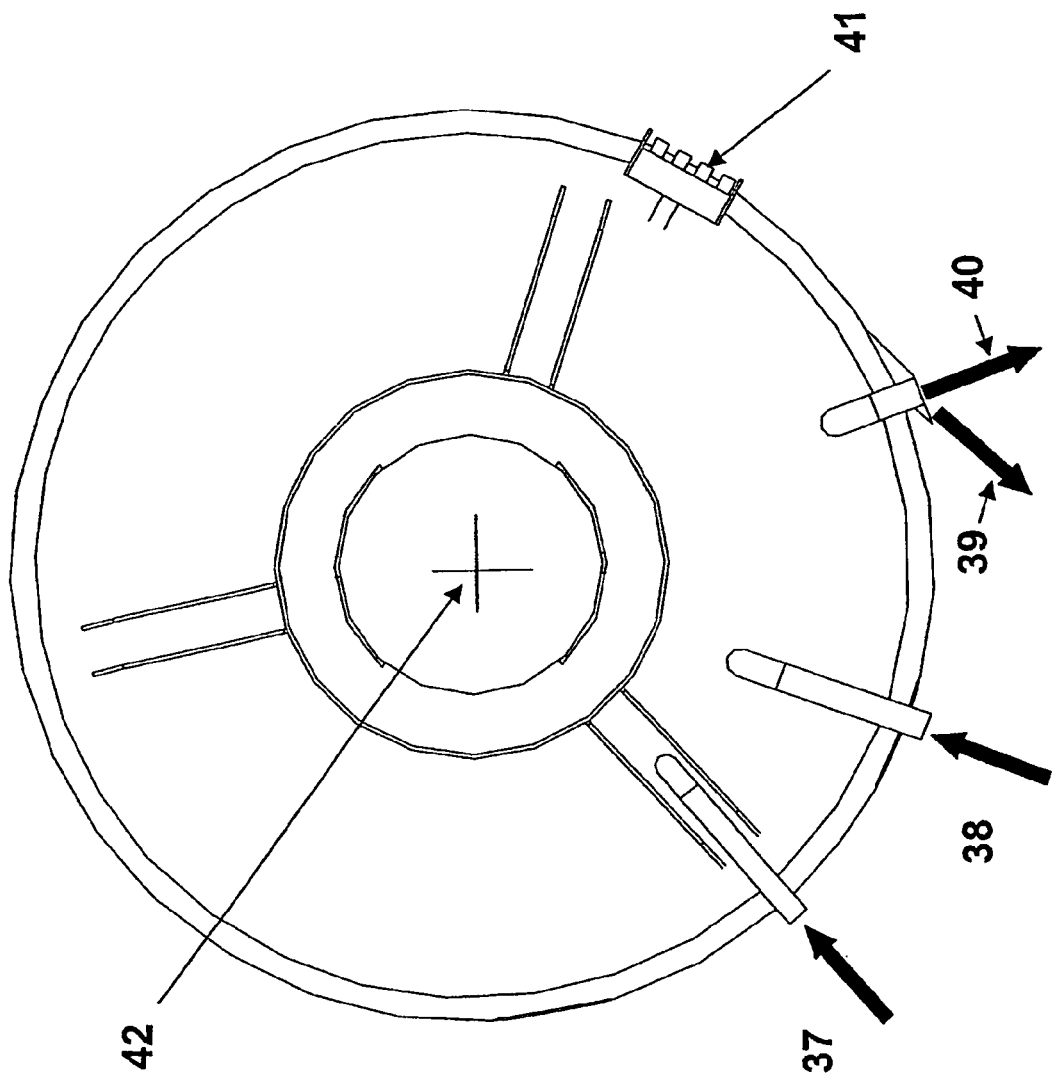
FIG. 13 is a plan view of the separator tank shown in FIGS. 11 and 12.

FIG. 13 shows that the tank is substantially symmetrically about the center hole 42 for the well head.

Figure 14:
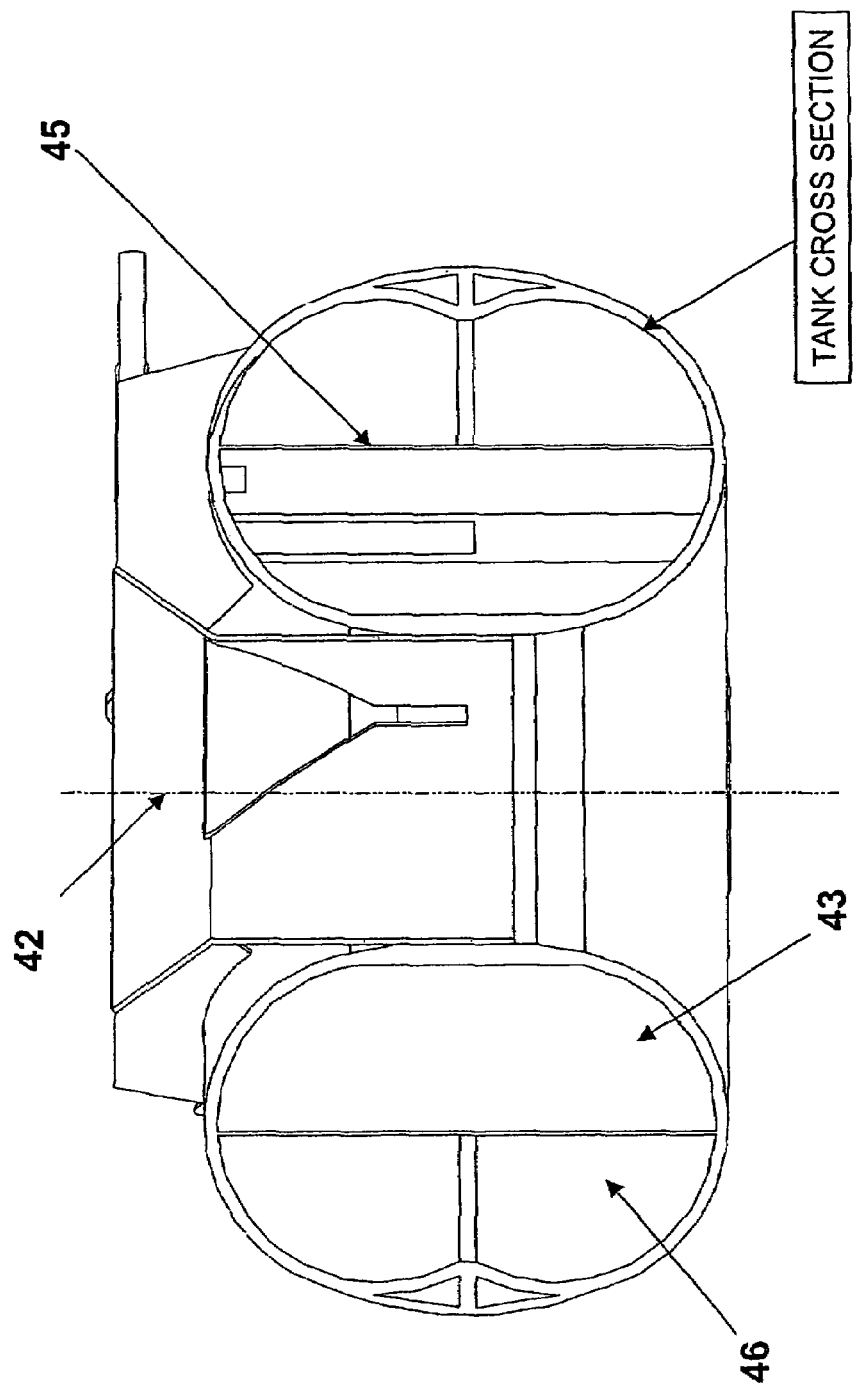
FIG. 14 is a cross section of the separator tank shown in FIGS. 11, 12 and 13 from the side. The cross section shows an internal and an external volume.

FIG. 14 shows a cross section of the tank seen from the side. As shown, the tank includes an internal vertical wall 45 parting the tank into two races creating two connected volumes. These are shown as an inner race volume 43 and an outer race volume 46.

Figure 15:
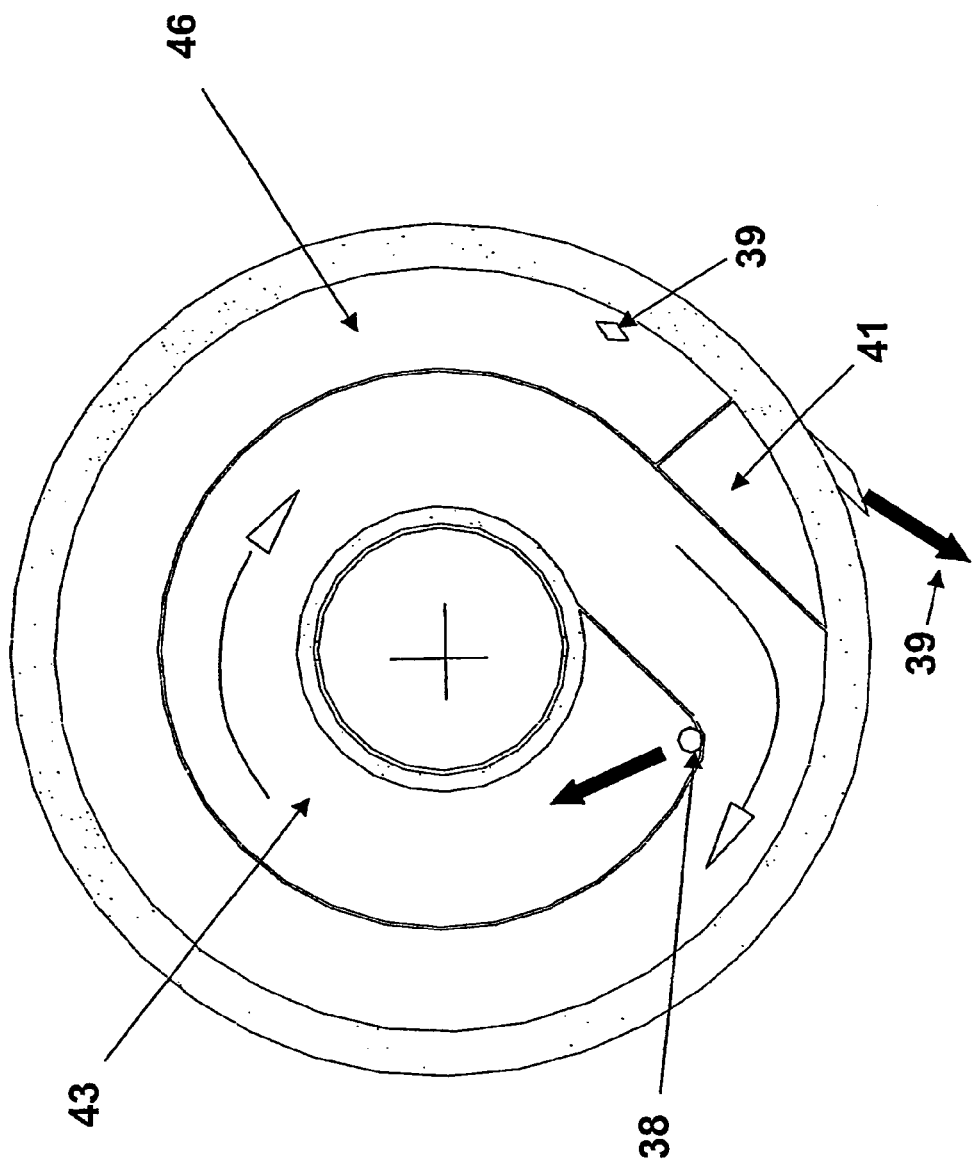
FIG. 15 is a cross section of the separator tank shown in FIGS. 11-14 in a plan view.

FIG. 15 is a cross section of the tank seen from the inside where the inner race volume 43 and the outer race volume 46 are clearly shown. Furthermore, the figure shows where the inlet for the liquid from the hydrocyclone 38 goes into the inner race volume 43 and where the outlet for the process water 39 is placed in the outer race volume 46 and the placement of the oil collector 47 at the oil outlet 40.

Figure 16:
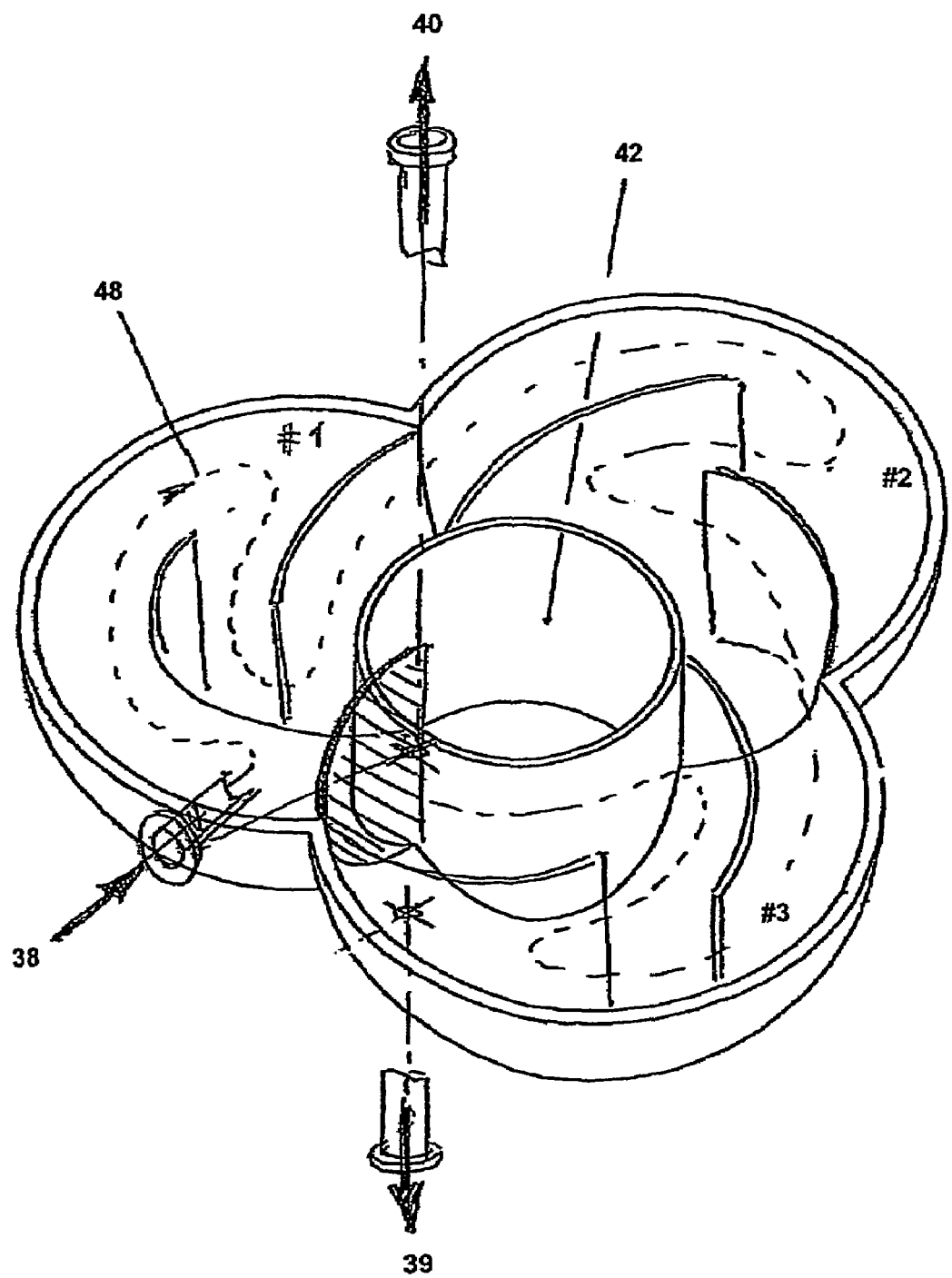
FIG. 16 is a cut through perspective view of a separator tank according to another embodiment, where the separator tank includes flow races with approximately constant cross section and prolonged flow path.

FIG. 16 shows an alternative embodiment of a separator tank according to the invention. From the figure it can be seen that the tank includes internal deflector plates or guide vanes. The illustrated tank has a pressure carrying cup shell with an internal arrangement suited to prolong the flow path. The tank is symmetrical about the center hole or the opening 42 for the well head. The inlet 38 for fluid that is to be separated, or crude oil, follows along the dashed line 48 along the inside of the separator tank. A water outlet 39 and oil/gas outlet 40 are also shown.

The separator tank is a tank with three horizontal spheres or cup shells. In the illustrated embodiment, there are internal plates or deflectors that are placed to increase the separation time and to increase the distance between the inlet and outlet as much as possible.

FIG. 17 shows the described alternative separator tank, with three horizontal spheres creating an internal volume where the separation of crude oil takes place substantially in conditions corresponding to what is normally called a "horizontal separator". The separator consists of cup shell symmetrically placed about the opening 42 that is formed by a cylindrical tube in the center going therethrough. The cylindrical tube in the center is designed for access to the well head. The inner volume of the separator is substantially established by the use of these cup shells. The separator will typically be exposed to internal and external pressure corresponding to the production pressure of the tube system and approximately full hydrostatic pressure respectively. The cupshells provide clear advantages in terms of wall thickness in the separator tank, in relation to necessary welding technology during fabrication, use of materials, weight and, thereby expenses. These properties are due to the fact that the cup shape is, mechanically speaking, optimal in relation to the smallest surface in relation to closed volume, and has the ability to withstand external pressure loads with a good stability towards dimensional changes. The cylindrical tube has an internal diameter adapted to the outer diameter of a connection for a well head coupling belonging to a water injection-tree.

Figure 18:
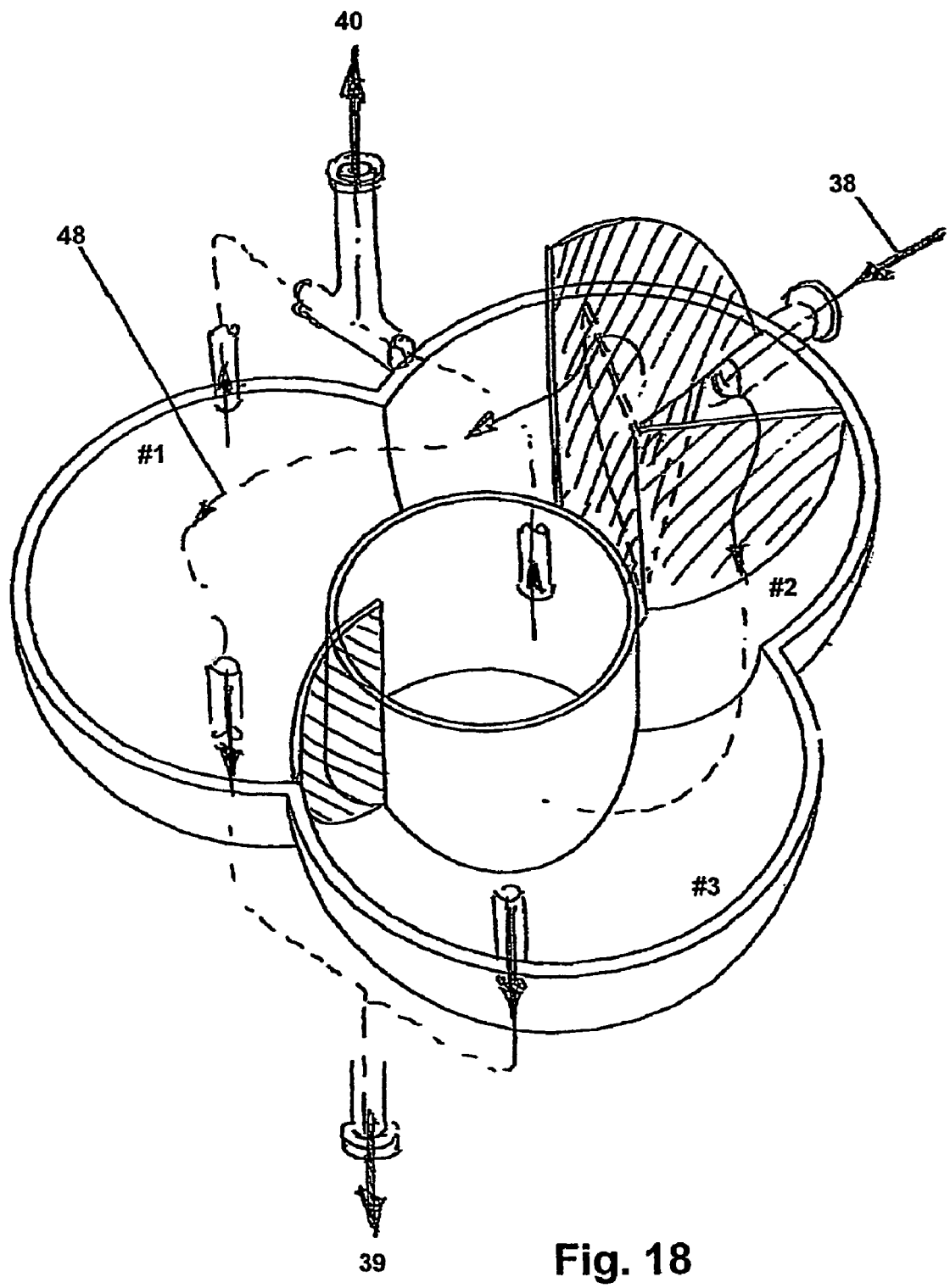
FIG. 18 shows a cross section of a separator tank in perspective view according to still another embodiment where the separator tank includes a flow splitter and two parallel chambers.

FIG. 18 shows still a further embodiment of a separator tank with parallel separation chambers. In the figure the circulation is shown with the dashed line 48.

The chambers are shown with an internal quantity splitter. Separated crude oil in cup #2 is divided in two volumes for separation in cup #1 and #3 respectively by means of an internal quantity splitter, shown as placed in a Y-configuration in cup #2.

Figure 19:
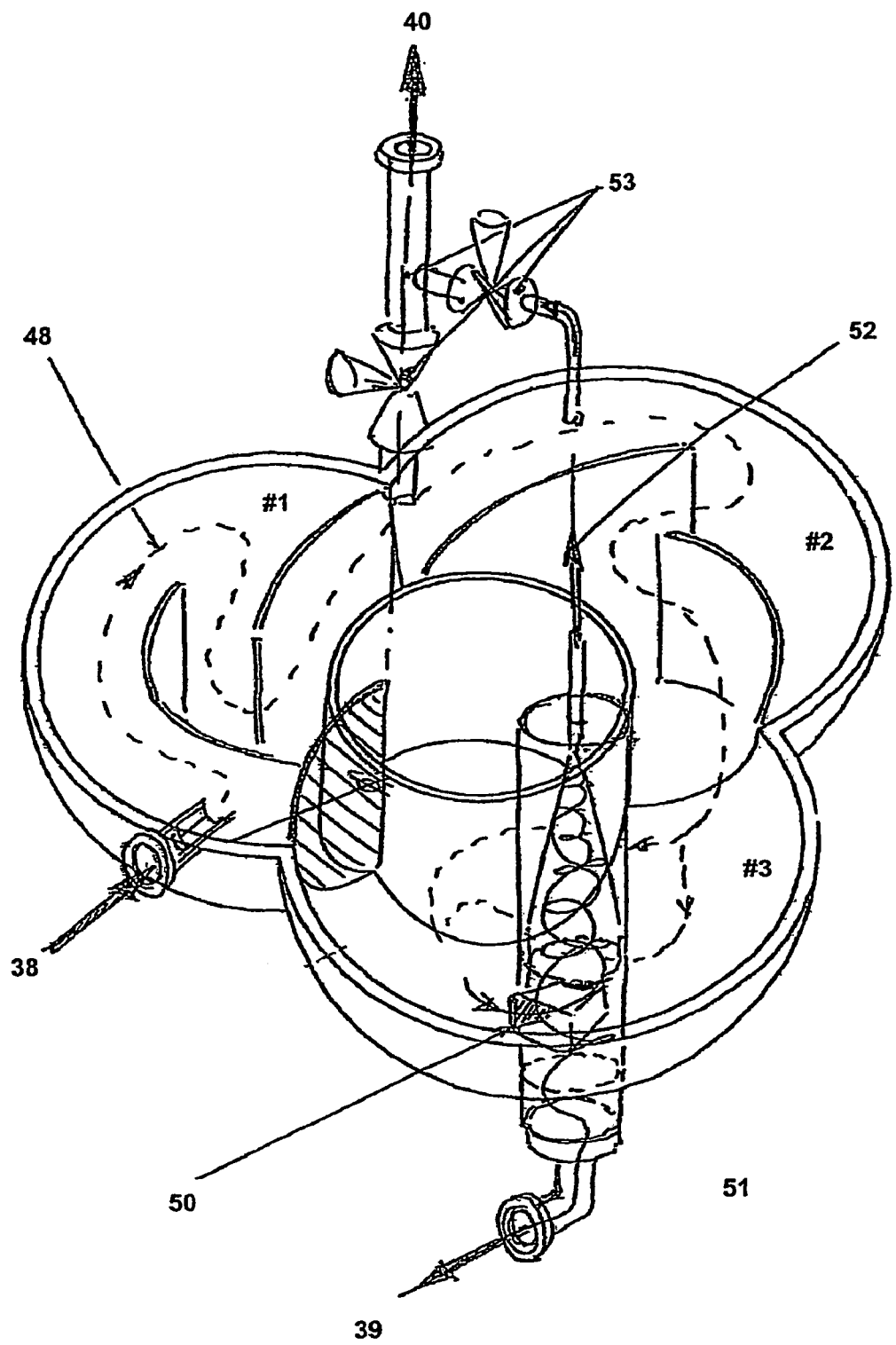
FIG. 19 shows a cross section in perspective view of a separator tank according to still another embodiment with a fixed, built in hydrocyclone for oil separation, mounted by the water outlet.

FIG. 19 shows still another embodiment of a separator tank with an outer water outlet integrated in hydrocyclone 51, with an internal inlet 50. As shown in the figure, control valves 53 are placed at the inlet of an ejector 52 and at the outlet for separated oil 40 to inject a small amount of water into the crude oil. Also, an outlet for separated water 39 is shown.

This separator tank also comprises internal deflectors, see above, where separated water at the outlet of the flow path, is led through a built-in hydrocyclone 16 arranged to reduce oil content in separated water.

Figure 20:
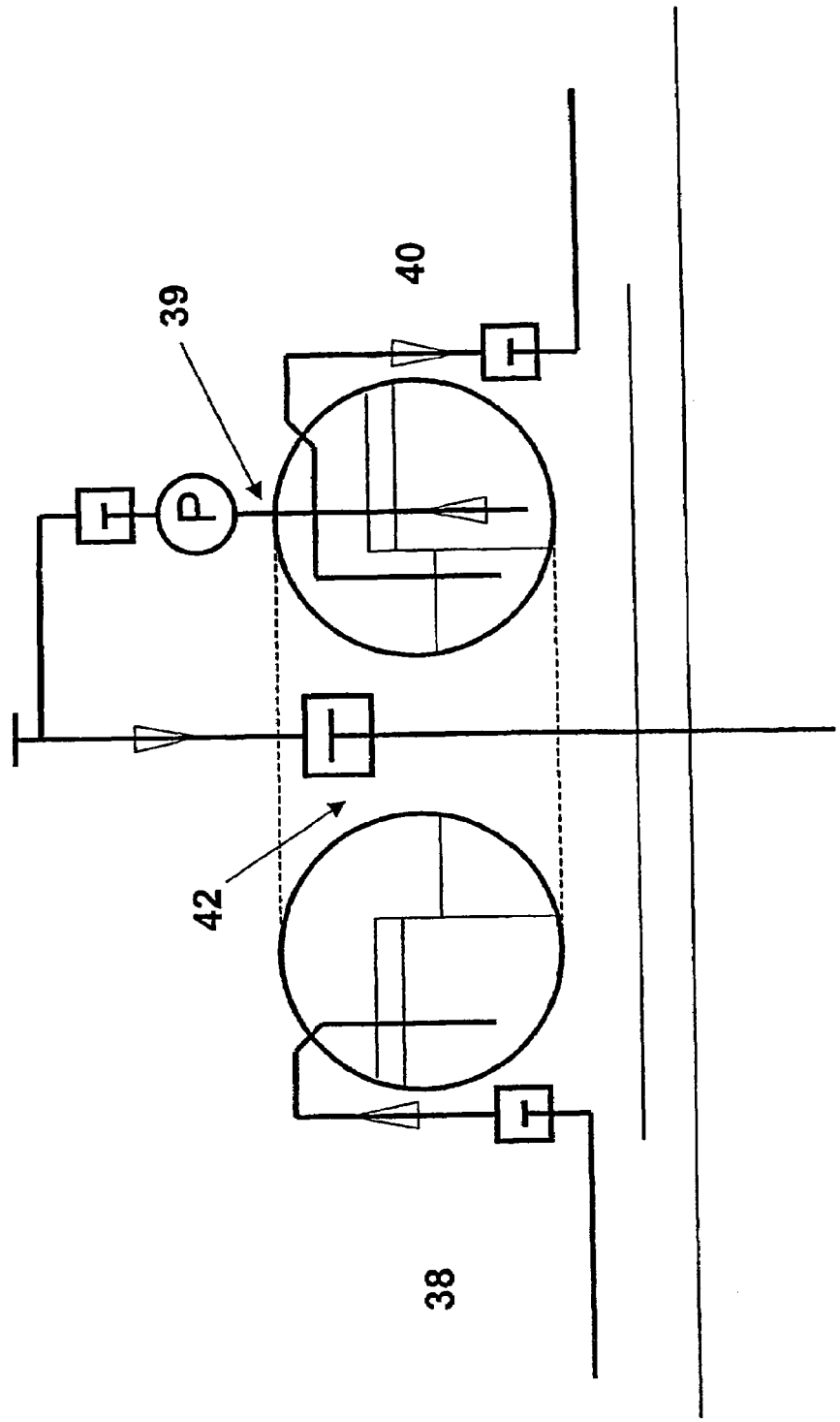
FIG. 20 is a schematic diagram of a separation apparatus with a cross section of a separator tank according to the invention showing how the fluids flow in and out of the tank for water injection to a well.

FIG. 20 shows schematically a separation plant with a separator tank in cross section, to show how the plant is placed around a water injection tree well head.

Figure 21:
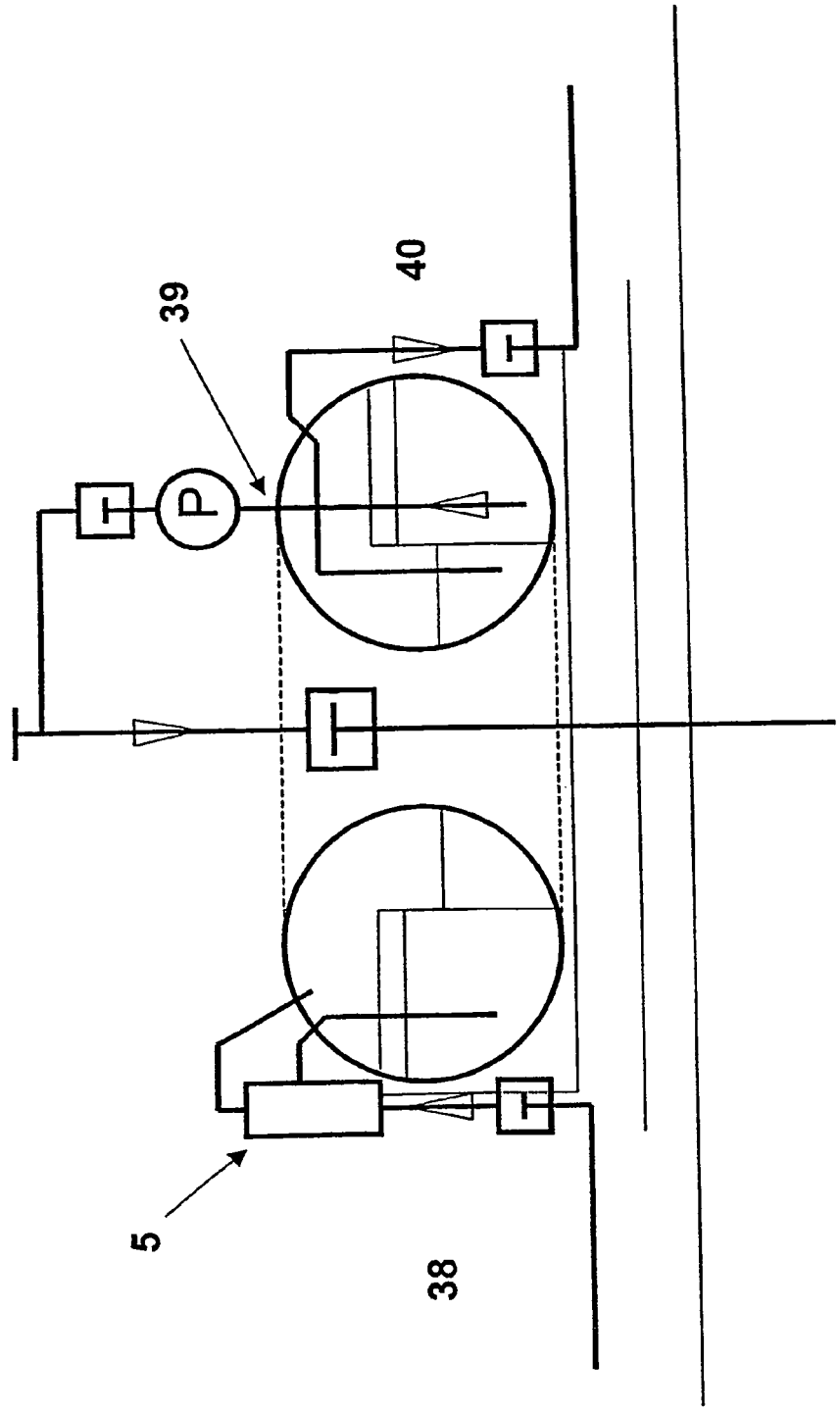
FIG. 21 is a schematic diagram of a separation apparatus with a cross section of a separator tank according to the invention, corresponding to the one shown in FIG. 20, additionally showing a fluid gas cyclone, for water injection to a well.

FIG. 21 shows schematically how a plant, with a liquid/gas hydrocyclone at the inlet, is placed around a water injection tree well head.

Figure 22:
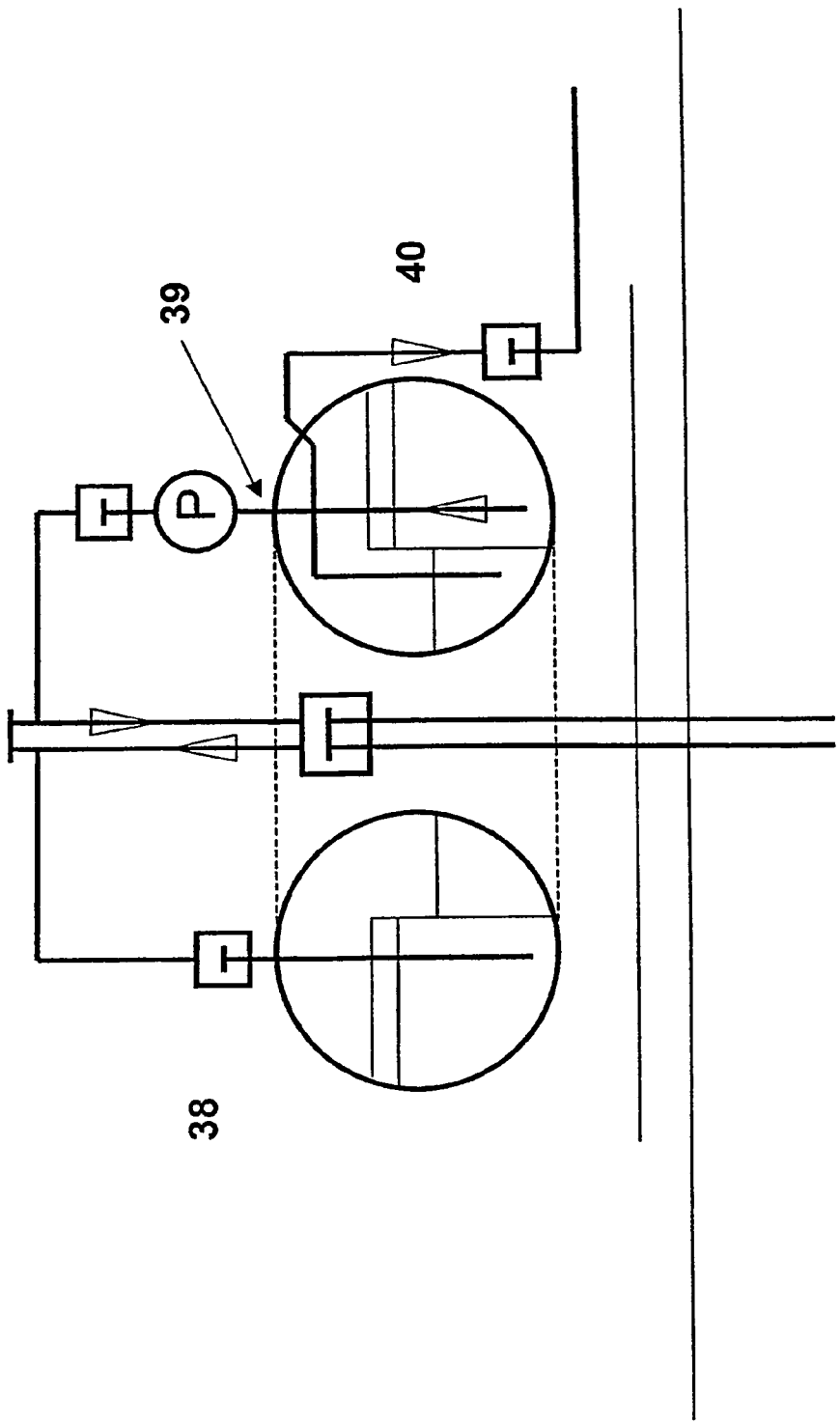
FIG. 22 is a schematic diagram of a cross section of a separator tank according to the invention on a well head unit for the production and water injection, where split- or "multiple tubing completion" is used.

FIG. 22 shows schematically an arrangement for the production of crude oil and injection of separated water, in the same well head completion.

The separator tank, as a part of a separator module described above, can find its use where the center position is used to place a pump for separated water, and/or a combination of liquid pump and gas compressor. This provides a very compact assembly of the equipment.

Figure 23:
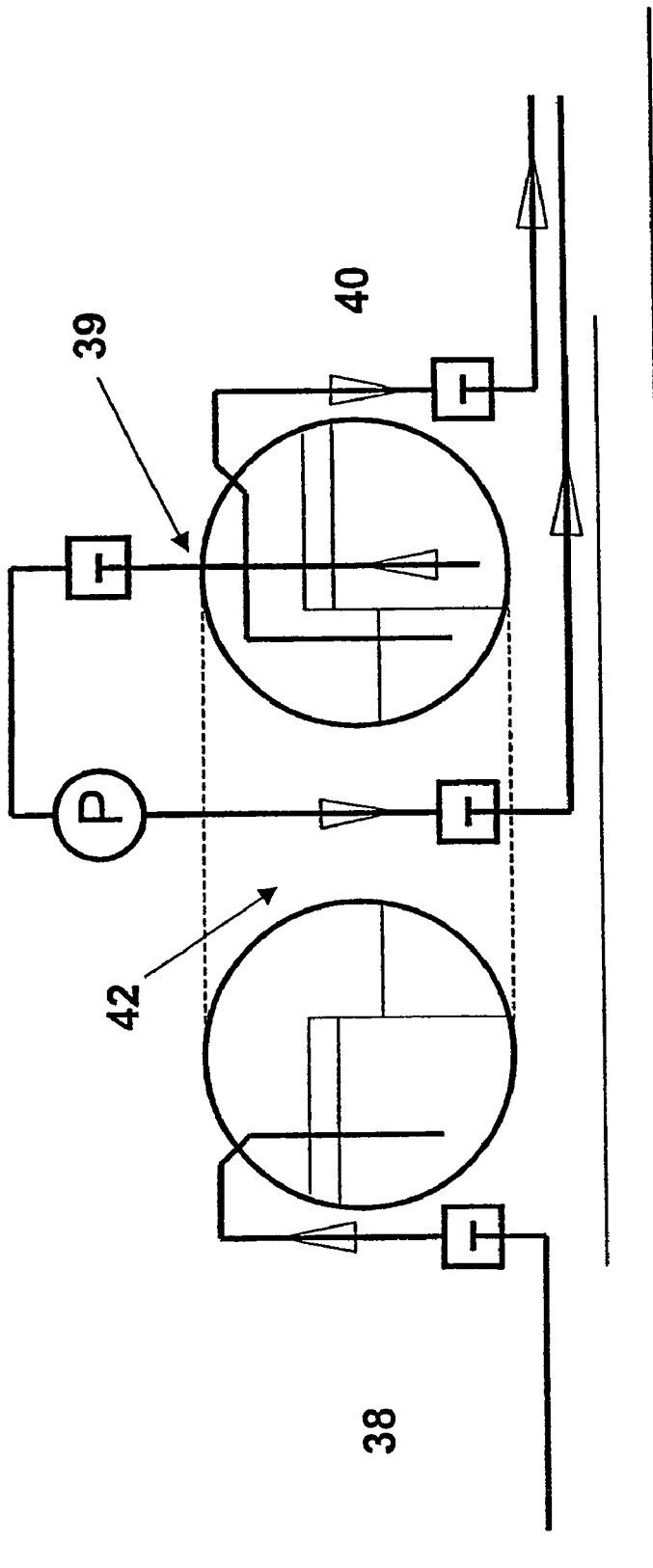
FIG. 23 is a schematic diagram of a cross section of a separator tank according to the invention where a pump and separator is shown as an assembly, without a well for direct water injection being shown.

FIG. 23 therefore shows schematically a plant without a well head, where the assembly provides a "compact pump and separator unit".

Figure 24:
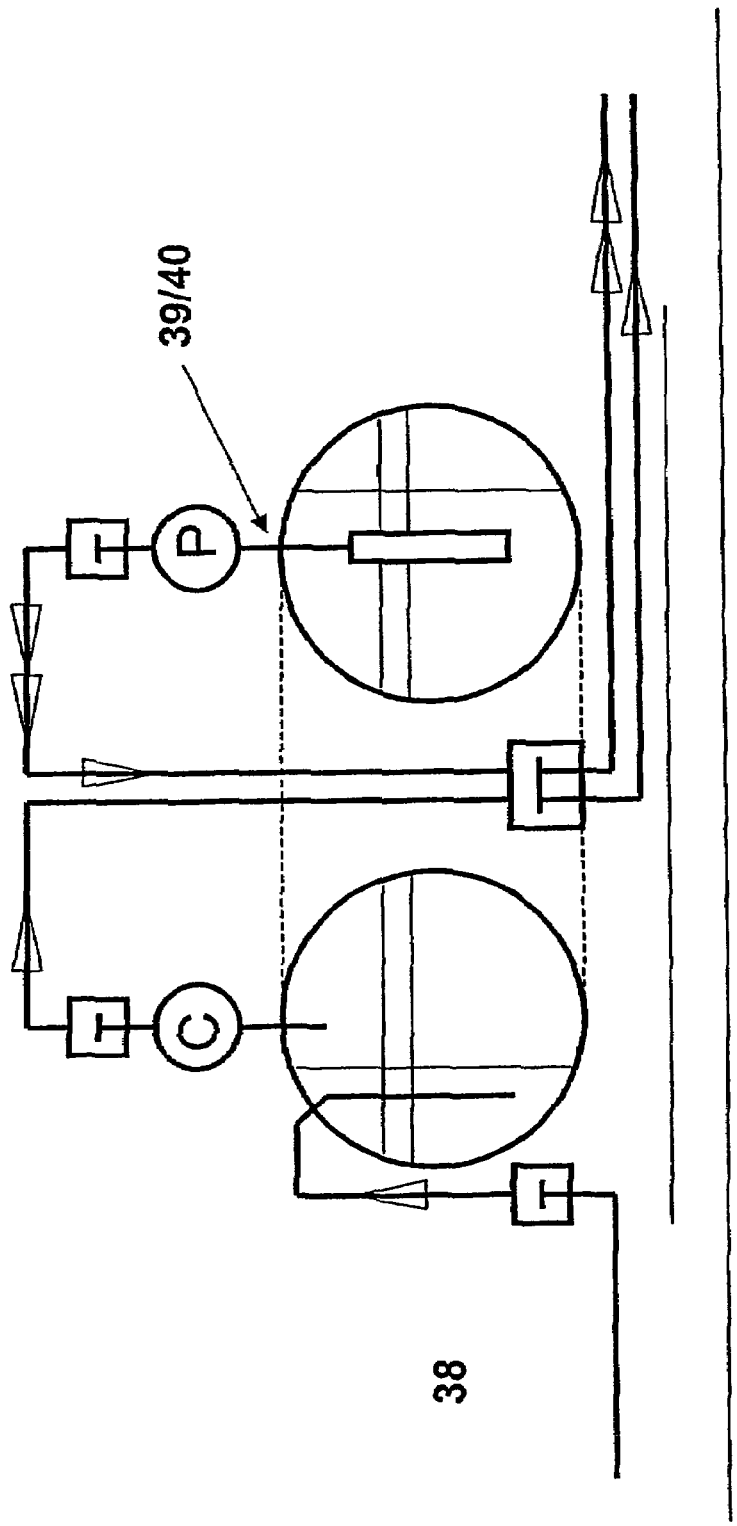
FIG. 24 is a schematic diagram of a cross section of a separator tank according to the invention where a pump, a compressor and a separator is shown as an assembly, with the purpose of providing a pressure increase in both of the two phases (gas and liquid)

FIG. 24 furthermore shows schematically a plant without a well head, where the assembly provides a "compact pump/compressor and separator unit".

FIG. 25a is a schematic diagram of a well head unit for production with pressure in the water outlet, adapted for placement on a production well, where the inlet 38, the outlet for oil 40, and the outlet for pressurized water 39 are shown.

FIG. 25b is a schematic diagram of a well head unit for production with pressure in the oil/gas outlet, showing a cross section of a separator tank according to the invention adapted for being placed on a production well, where the inlet 38, the outlet for water 39, and the outlet for pressurized oil/gas 40 are shown.

In this specification a subsea plant has been described. It may, however, also be practical to use such a plant in land based installations.

The invention claimed is:

1. A subsea separation apparatus for processing crude oil, said separation apparatus comprising process equipment for the crude oil and a separator module, said separator module including:
   a separator tank for separating water from the crude oil, said separator tank being a separately retrievable module defining an opening extending there through, wherein said opening is located substantially at the geometric center of said separator tank, and is dimensioned to surround a wellhead for injecting the separated water into a well bore; and
   an injection pump operative to pressurize and deliver the separated water to the wellhead, thereby injecting the separated water into the well bore.

2. The subsea separation apparatus according to claim 1, wherein said separator module is adapted to be substantially concentrically placed on the wellhead in a substantially horizontal position, such that the vertical central axis and the center of gravity of said separator module are substantially concentric in relation to the wellhead.

3. The subsea separation apparatus according to claim 1, further comprising:
   a base frame;
   a guide base placed on said base frame; and
   a tubing and valve system placed on said guide base, wherein said separator module is disposed on said guide base.

4. The subsea separation apparatus according to claim 3, wherein said guide base includes a guideline fixture or guide posts.

5. The subsea separation apparatus according to claim 1, wherein said process equipment is centered on said separator module in a guidelineless manner via a stabbing skirt mounted on said separator module.

6. The subsea separation apparatus according to claim 1, further comprising a water injection tree disposed on top of said separator tank, said water injection tree having a portion passing through said opening defined by said separator tank.

7. The subsea separation apparatus according to claim 6, wherein an inlet of said separator module includes at a connection for a pre-processing, sand separation hydrocyclone, and an outlet of said separator module includes at least one connection for a post-processing hydrocyclone.

8. The subsea separation apparatus according to claim 6, wherein said water injection tree is adapted to be placed as a connection spool element directly between a separated water outlet of said separator tank and the wellhead, said water injection tree including a flow line connection adapted to be placed over a coupling to the wellhead, such that said water injection tree can be directly connected between the separated water outlet and the wellhead in a manner that reduces the height of an assembly formed when said separator tank and said water injection tree are installed on the wellhead.

9. The subsea separation apparatus according to claim 6, further comprising a sand-liquid hydrocyclone or a gas-liquid hydrocyclone located upstream of an inlet of said separator module; and a hydrocyclone located upstream of said injection pump for removing oil in the separated water.

10. The subsea separation apparatus according to claim 1, wherein said separator module further comprises tubing for carrying the separated water, said tubing being arranged in said separator module such that heat from the crude oil inside of said separator tank can transfer to the separated water to prevent or delay creation of hydrate ice plugs inside of said tubing.

11. The subsea separation apparatus according to claim 1, wherein said separator tank is a horizontal three phase separator tank comprising:
   a plurality of double curved pressure shell elements which are rotationally and symmetrically placed; and
   a centrally located cylindrical tube disposed in said opening, wherein said tube includes a skirt to allow guidelineless centering and alignment of said water injection tree.

12. The subsea separation apparatus according to claim 1, wherein said separator tank is a pressure carrier which is relatively stronger for internal pressure than external pressure, said separator tank being shaped such that implosion or a potential loss of internal pressure will not cause deflection of said separator tank.

13. The subsea separation apparatus according to claim 1, wherein said separator tank comprises internal deflectors which are shaped and arranged to extend a fluid path between an inlet of said separator tank and an outlet of said separator tank to, thereby, maximize a time of residence of the crude oil in said separator tank, and minimize turbulence during the separation of water from the crude oil.

14. The subsea separation apparatus according to claim 1, wherein said separator tank includes:
   a labyrinth or snail shell-type internal arrangement with an inlet located at an inner side of the center thereof;
   a standard well wall located at an end of said internal arrangement to define an oil collecting chamber, said oil collecting chamber being downstream of said standard well wall; and
   a sink for separated water disposed upstream of said standard well wall.

15. The subsea separation apparatus according to claim 1, wherein said separator tank includes an internal quantity splitter for separating the crude oil into two volumes.

16. The subsea separation apparatus according to claim 1, wherein said separator tank comprises an outlet and a built-in hydrocyclone for oil separation, and wherein said separator tank is shaped such that said outlet and said built-in hydrocyclone are in fluid communication.

17. The subsea separation apparatus according to claim 1, further comprising a plurality of separate, retrievable modules.

18. The subsea separation apparatus according to claim 17, wherein said separate, retrievable modules are adapted to be concentrically inserted in said opening.

19. The subsea separation apparatus according to claim 1, wherein said separator tank is torus shaped.

20. The subsea separation apparatus according to claim 1, wherein said injection pump and said process equipment are radially arranged around said separator tank, and said injection pump and said process equipment are connected to said separator tank by a plurality of radially configured tubular connections.

21. A subsea separation apparatus for processing crude oil, said separation apparatus comprising process equipment for processing the crude oil; a wellhead; and a separator module disposed on said wellhead, said separator module including:
- a separator tank for separating water from the crude oil, said separator tank being a separately retrievable module defining a central opening, wherein said opening is located substantially at the geometric center of said separator tank, and said wellhead extends through said opening so that the separated water can be injected into a well bore of said wellhead; and
- an injection pump operative to pressurize and deliver the separated water to said wellhead, thereby injecting the separated water into the well bore of said wellhead.

* * * * *